(12) United States Patent
Saito et al.

(10) Patent No.: US 7,961,565 B2
(45) Date of Patent: Jun. 14, 2011

(54) OPTICAL DISK APPARATUS AND OPTICAL ABERRATION CORRECTING METHOD

(75) Inventors: Kimihiro Saito, Saitama (JP); Takao Kondo, Tokyo (JP); Hirotaka Miyamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 794 days.

(21) Appl. No.: 11/848,885

(22) Filed: Aug. 31, 2007

(65) Prior Publication Data

US 2008/0068942 A1 Mar. 20, 2008

(30) Foreign Application Priority Data

Sep. 14, 2006 (JP) .................................. 2006-249807

(51) Int. Cl.
*G11B 7/00* (2006.01)
(52) U.S. Cl. ............... 369/44.23; 369/44.32; 369/44.37; 369/112.23; 369/112.02
(58) Field of Classification Search .................... None
See application file for complete search history.

(56) References Cited

U.S. PATENT DOCUMENTS 7,224,653 B2 * 5/2007 Takehara et al. ............. 369/47.5

FOREIGN PATENT DOCUMENTS

| JP | 4-87028 | 3/1992 |
| JP | 11-133843 | 5/1999 |
| JP | 2002-123948 | 4/2002 |
| JP | 2006-209821 | 8/2006 |
| JP | 2006-338782 | 12/2006 |

OTHER PUBLICATIONS

Robert R. McLeod, et al., "Microholographic multilayer optical disk data storage", Applied Optics, vol. 44, No. 16, Jun. 1, 2005, 1 cover and pp. 3197-3207.

* cited by examiner

*Primary Examiner* — Muhammad N. Edun
(74) *Attorney, Agent, or Firm* — Oblon, Spivak, McClelland, Maier & Neustadt, L.L.P.

(57) ABSTRACT

An optical disk apparatus irradiates first and second lights, which are emitted from an identical light source, on a disk-like volumetric recording medium from both sides thereof with first and second object lenses corresponding to the first and second lights, respectively, such that the lights are focused in an identical focal point position and records a standing wave. The optical disk apparatus includes an aberration adding unit that adds complementary aberrations to the first and second lights made incident on the volumetric recording medium, respectively.

11 Claims, 18 Drawing Sheets

OPTICAL DISK APPARATUS AND OPTICAL ABERRATION CORRECTING METHOD

CROSS-REFERENCES TO RELATED APPLICATIONS

The present invention contains subject matter related to Japanese Patent Application JP 2006-249807 filed in the Japanese Patent Office on Sep. 14, 2006, the entire contents of which being incorporated herein by reference.

BACKGROUND OF THE INVENTION

1. Field of the Invention

The present invention relates to an optical disk apparatus and an optical aberration correcting method and is suitably applied to, for example, an optical disk apparatus that records a hologram on an optical disk.

2. Description of the Related Art

An optical disk apparatus that irradiates a light beam on an optical disk such as a CD (Compact Disc), a DVD (Digital Versatile Disc), or a Blu-ray Disc®, hereinafter referred to as BD) and reads reflected light of the light beam to reproduce information has been widely spread.

Such an optical disk apparatus in the past irradiates a light beam on the optical disk and changes a local reflectance and the like of the optical disk to thereby record information.

Concerning the optical disk, it is known that a size of a light spot formed on the optical disk is roughly given by $\lambda/NA$ ($\lambda$: wavelength of a light beams, NA: numerical aperture) and resolution is proportional to this value. For example, details of the BD that can record data of about 25 [GB] on an optical disk having a diameter of 120 [mm] are described in Y. Kasami, Y. Kuroda, K. Seo, O. Kawakubo, S. Takagawa, M. Ono, and M. Yamada, Jpn. J. Appl. Phys., 39, 756 (2000).

Various kinds of information including various contents such as music contents and video contents and various data for computers are recorded on the optical disk. In particular, in recent years, an amount of information has increased because of high definition of videos, high sound quality of music, and the like. An increase in the number of contents recorded on one optical disk is demanded. Thus, a further increase in capacity of the optical disk is demanded.

Thus, there is also proposed a method of superimposing recording layers in one optical disk to thereby increase a recording capacity in the disk (see, for example, I. Ichimura et al, Technical Digest of ISOM' 04, pp 52, Oct. 11 to 15, 2005, Jeju Korea).

On the other hand, as a method of recording information on an optical disk, there is also proposed an optical disk apparatus employing a hologram (see, for example, R. R. McLeod et al., "Microholographic multilayer optical disk data storage," Appl. Opt., Vol. 44, 2005, pp 3197).

For example, as shown in FIG. 1, an optical disk apparatus 1 once condenses a light beam in an optical disk 8 made of photopolymer or the like, a refractive index of which changes according to the intensity of light irradiated thereon, from an optical head 7 and thereafter condenses a light beam in an identical focal point position again from the opposite direction using a reflecting device 9 provided on a rear surface side (a lower side in FIG. 1) of the optical disk 8.

The optical disk apparatus 1 causes a laser 2 to emit a light beam formed by a laser beam, modulates a light wave of the light beam with an acoustic optical modulator 3, and converts the light beam into parallel light with a collimator lens 4. Subsequently, the light beam is transmitted through a polarization beam splitter 5, converted from linear polarized light into circular polarized light by a quarter-wave plate 6, and then made incident on the optical head 7.

The optical head 7 can perform recording and reproduction of information. The optical head 7 reflects the light beam with a mirror 7A, condenses the light beam with an object lens 7B, and irradiates the light beam on the optical disk 8 rotated by a spindle motor (not shown).

At this point, the light beam is once focused in the inside of the optical disk 8, then reflected by the reflecting device 9 arranged on the rear surface side of the optical disk 8, and condensed at an identical focal point in the inside of the optical disk 8 from the rear surface side of the optical disk 8. The reflecting device 9 includes a condenser lens 9A, a shutter 9B, a condenser lens 9C, and a reflection mirror 9D.

As a result, as shown in FIG. 2A, a standing wave is generated in a focal point position of the light beam. A recording mark RM that generally assumes a shape obtained by sticking two cones together on bottom surfaces thereof and includes a hologram having a small light spot size is formed. In this way, this recording mark RM is recorded as information.

In recording plural recording marks RM in the inside of the optical disk 8, the optical disk apparatus 1 rotates the optical disk 8 and arranges the respective recording marks RM along a track of a concentric circle shape or a spiral shape to thereby form one mark recording layer. The optical disk apparatus 1 can record the respective recording marks RM in such a manner as to superimposing plural mark recording layers by adjusting the focal point position of the light beam.

Consequently, the optical disk 8 has a multilayer structure having the plural mark recording layers in the inside thereof. For example, as shown in FIG. 2B, in the optical disk 8, a distance between the recording marks RM (a mark pitch) p1 is 1.5 [μm], a distance between tracks (a track pitch) p2 is 2 [μm], and a distance between layers p3 is 22.5 [μm].

In reproducing information from the optical disk 8 in which the recording marks RM are recorded, the optical disk apparatus 1 closes a shutter 9B of the reflecting device 9 to prevent a light beam from being irradiated on the optical disk 8 from the rear surface side thereof.

In this case, the optical disk apparatus 1 irradiates, with the optical head 7, the light beam on the recording marks RM in the optical disk 8 and makes a reproduced light beam generated from the recording marks RM incident on the optical head 7. This reproduced light beam is converted from circular polarized light into linear polarized light by the quarter-wave plate 6 and reflected by the polarization beam splitter 5. The reproduced light beam is condensed by the condenser lens 10 and irradiated on a photodetector 12 via a pinhole 11.

The optical disk apparatus 1 detects an amount of light of the reproduced light beam with the photodetector 12 and reproduces the information on the basis of a result of the detection.

SUMMARY OF THE INVENTION

When the optical disk apparatus 1 irradiates a light beam to focus the light beam in the inside of the optical disk 8 as shown in FIG. 2C, the light beam is transmitted through a portion from the surface of the optical disk 8 to a focal point. Consequently, aberration such as spherical aberration occurs in the light beam.

Since the optical disk apparatus 1 irradiates light beams on the optical disk 8 from opposite directions to focus the light beams at an identical focal point, it is highly likely that distances from the surface of the optical disk 8 to the focal point (hereinafter referred to as cover thicknesses) are different from each other. In this case, degrees of spherical aberrations or the like that occurs in the respective light beams are also different.

When the light beams have the spherical aberrations in this way, the optical disk apparatus 1 may be unable to form a satisfactory hologram. Therefore, it is desirable to correct the spherical aberrations with appropriate optical means.

However, the optical disk apparatus 1 does not have specific optical means that can correct spherical aberration. Moreover, it is difficult to adjust an amount of correction of the spherical aberration or the like corresponding to a focal point position. Thus, it is likely that recording accuracy and reproduction accuracy of recording marks are deteriorated and, actually, recording and reproduction of information may not be able to be correctly performed.

Therefore, it is desirable to provide an optical disk apparatus that can highly accurately record a hologram representing information in and reproduce the hologram from an optical disk and an optical aberration correcting method that can satisfactorily correct aberration of light used for the recording and the reproduction of the hologram.

According to an embodiment of the present invention, there is provided an optical disk apparatus that irradiates first and second lights, which are emitted from an identical light source, on a disk-like volumetric recording medium from both sides thereof with first and second object lenses corresponding to the first and second lights, respectively, such that the lights are focused in an identical focal point position and records a standing wave, the optical disk apparatus including aberration adding means for adding complementary aberrations to the first and second lights made incident on the volumetric recording medium, respectively.

In this optical disk apparatus, by irradiating the first and second lights, to which the complementary aberrations are added, in the identical focal point position from both the sides of the volumetric recording medium, it is possible to correct aberrations at focal points of the first and second lights by the same degree.

According to another embodiment of the present invention, there is provided an optical aberration correcting method in irradiating first and second lights, which are emitted from an identical light source, on a predetermined irradiation object from both sides thereof with first and second object lenses corresponding to the first and second lights, respectively, such that the lights are focused in an identical focal point position, the optical aberration correcting method including an aberration adding step of adding complementary aberrations to the first and second lights made incident on the irradiation object.

In this optical aberration correcting method, by irradiating the first and second lights, to which the complementary aberrations are added, in the identical focal point position from both the sides of the irradiation object, it is possible to correct aberrations at focal points of the first and second lights by the same degree.

According to still another embodiment of the present invention, there is provided an optical disk apparatus that irradiates first and second lights, which are emitted from an identical light source, on a disk-like volumetric recording medium from both sides thereof with first and second object lenses corresponding to the first and second lights, respectively, such that the lights are focused in an identical focal point position and records a standing wave, the optical disk apparatus including aberration adding means for adding complementary aberrations to at least one of the first and second lights made incident on the volumetric recording medium.

According to still another embodiment of the present invention, there is provided an optical disk recording method of recording a standing wave on a disk-like volumetric recording medium, the optical disk recording method including the steps of irradiating first and second lights, which are emitted from an identical light source, on the volumetric recording medium from both sides thereof with first and second object lenses corresponding to the first and second lights, respectively, such that the lights are focused in an identical focal point position and adding complementary aberrations to at least one of the first and second lights made incident on the volumetric recording medium.

According to the embodiments of the present invention, by irradiating the first and second lights, to which the complementary aberrations are added, in the identical focal point position from both the sides of the volumetric recording medium, it is possible to correct aberrations at focal points of the first and second lights by the same degree. Therefore, it is possible to realize an optical disk apparatus that can highly accurately record a hologram representing information in and reproduce the hologram from an optical disk.

According to the embodiments of the present invention, by irradiating the first and second lights, to which the complementary aberrations are added, in the identical focal point position from both the sides of the volumetric recording medium, it is possible to correct aberrations at focal points of the first and second lights by the same degree. Therefore, it is possible to realize an optical aberration correcting method that can satisfactorily correct aberration of light used for the recording and the reproduction of the hologram.

DESCRIPTION OF THE PREFERRED EMBODIMENTS

Embodiments of the present invention will be hereinafter explained in detail with reference to the accompanying drawings.

(1) First Embodiment (1-1) Structure of an Optical Disk

Figure 3A:
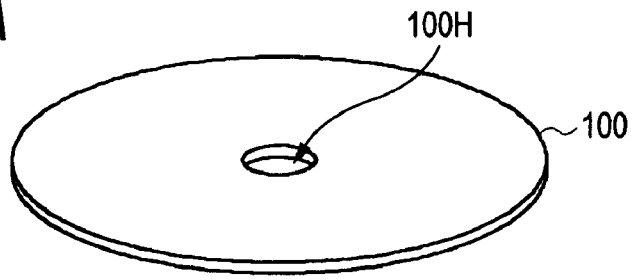
FIGS. 3A and 3B are schematic diagrams showing a structure of an optical disk according to an embodiment of the present invention.

First, an optical disk 100 used as an information recording medium in the present invention is explained. As shown in an external view in FIG. 3A, the optical disk 100 as a whole is formed in a disc shape having a diameter of about 120 [mm] in the same manner as a CD, a DVD, and a BD in the past. A hole 100H is formed in the center of the optical disk 100.

Figure 3B:
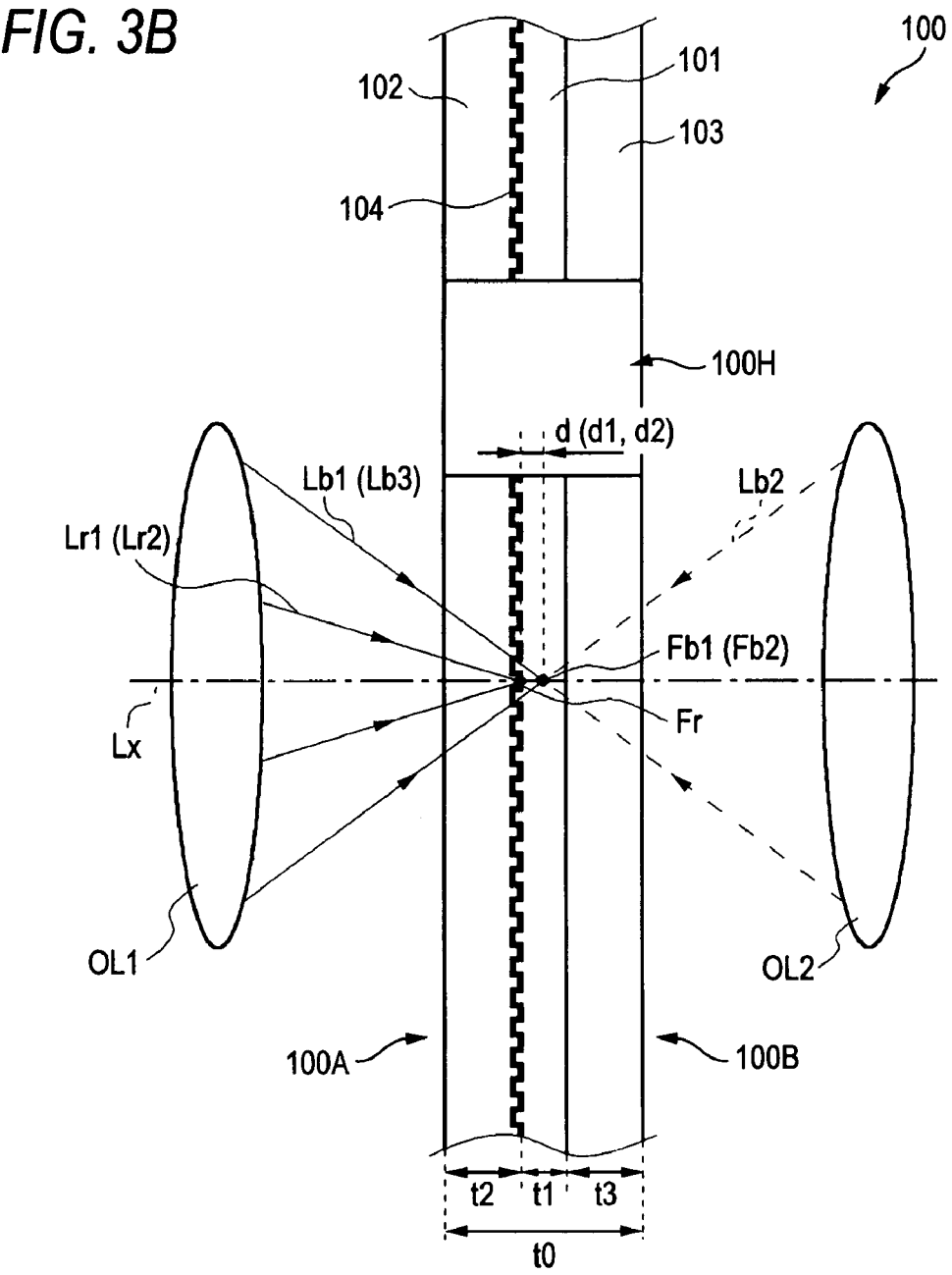

As shown in a sectional view in FIG. 3B, the optical disk 100 has, in the center thereof, a recording layer 101 for recording information. The recording layer 101 is held by substrates 102 and 103 from both sides thereof.

Thickness t1 of the recording layer 101 is set to about 0.3 [mm] and both thicknesses t2 and t3 of the substrates 102 and 103 are set to about 0.6 [mm]. Thickness t0 of the entire optical disk 100 is set to about 1.5 [mm].

The substrates 102 and 103 are made of a material such as polycarbonate or glass. Both the substrates 102 and 103 transmit light, which is made incident from one side thereof, to the other side at a high transmittance. The substrates 102 and 103 have a certain degree of strength and also take a role of protecting the recording layer 101.

The optical disk 100 is substantially symmetrical around the recording layer 101 with respect to a thickness direction. Measures are generally taken to prevent warp, distortion, and the like due to aged deterioration and the like from occurring as much as possible. Unnecessary reflection may be prevented on the surfaces of the substrates 102 and 103 by applying nonreflection coating to the surfaces.

Figure 1:
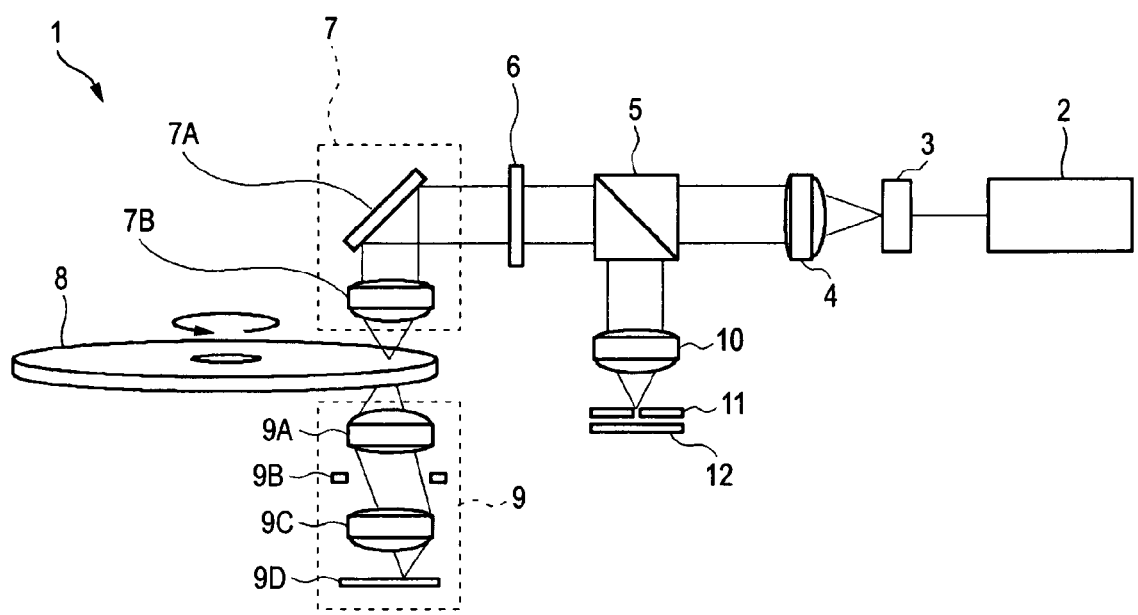
FIG. 1 is a schematic diagram showing a structure of an optical disk apparatus of a standing wave recording type in the past.
Figure 2A:
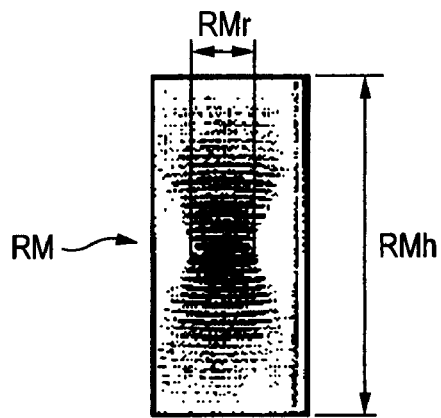
FIGS. 2A to 2C are schematic diagrams showing a state of formation of a hologram.

As in the optical disk 8 (FIG. 1), the recording layer 101 is made of photopolymer or the like, a refractive index of which changes according to the intensity of light irradiated thereon, to be reactive to a blue light beam having a wavelength of 405 [nm]. As shown in FIG. 3B, when two blue light beams Lb1 and Lb2 having relatively high intensity interfere with each other in the recording layer 101, a standing wave is generated in the recording layer 101. An interference pattern having a characteristic of a hologram shown in FIG. 2A is formed.

The recording layer 101 have a refractive index equivalent to those of the substrates 102 and 103 with respect to the blue light beam having a wavelength of 405 [nm] to prevent the blue light beam from being substantially refracted on a boundary surface between the recording layer 101 and the substrate 103 and the like.

The optical disk 100 has a reflective and transmissive film 104 as a reflective layer on the boundary surface between the recording layer 101 and the substrate 102. The reflective and transmissive film 104 is made of a dielectric multilayer film and the like. The reflective and transmissive film 104 has wavelength selectivity of transmitting the blue light beams Lb1 and Lb2 and a blue reproduced light beams Lb3 having a wavelength of 405 [nm] and reflecting a red light beam having a wavelength of 660 [nm].

In the reflective and transmissive film 104, guide grooves for tracking servo are formed. Specifically, spiral tracks are formed by lands and grooves same as those in a general BD-R (Recordable) disk and the like. An address as a series of numbers is affixed to this track for each predetermined recording unit such that track in which information is recorded or from which information is reproduced can be specified by the address.

Pits or the like may be formed instead of the guide grooves in the reflective and transmissive film 104 (i.e., the boundary surface between the recording layer 101 and the substrate 102) or the guide grooves and the pits or the like may be combined. In short, an address only has to be recognized by a light beam.

When a red light beam Lr1 is irradiated on the reflective and transmissive film 104 from the substrate 102 side, the reflective and transmissive film 104 reflects the red light beam Lr1 to the substrate 102 side. The light beam reflected to the substrate 102 side is referred to as a red reflected light beam Lr2.

It is assumed that the red reflected light beam Lr2 is used in, for example, in an optical disk apparatus, position control (i.e., focus control and tracking control) for a predetermined object lens OL1 for setting a focal point Fr of the red light beam Lr1 condensed by the object lens OL1 in a track as a target (hereinafter referred to as target track).

In the following explanation, a surface of the optical disk 100 on the substrate 102 side is referred to as a guide surface 100A and a surface of the optical disk 100 on the substrate 103 side is referred to as a recording-light irradiation surface 100B.

Practically, when information is recorded on the optical disk 100, as shown in FIG. 3B, the red light beam Lr1 is condensed by the object lens OL1, which is subjected to position control, to be focused on a target track in the reflective and transmissive film 104.

The blue light beam Lb1, which shares an optical axis Lx with the red light beam Lr1 and is condensed by the object lens OL1, is transmitted through the substrate 102 and the reflective and transmissive film 104 and focused on a position corresponding to a rear side of the target track (i.e., the substrate 102 side) in the recording layer 101. At this point, a focal point Fb1 of the blue light beam Lb1 is located at a further distance from the object lens OL1 than the focal point Fr on the common optical axis Lx.

The blue light beam Lb2, which has a wavelength identical with that of the blue light beam Lb1 and shares the optical axis Lx with the blue light beam Lb1, is condensed by an object lens OL2, which has an optical characteristic equivalent to that of the object lens OL1, from the opposite side of the blue light beam Lb1 (i.e., the substrate 103 side) and irradiated. In this case, when the object lens OL2 is subjected to position control, a focal point Fb2 of the blue light beam Lb2 is located in a position identical with that of the focal point Fb1 of the blue light beam Lb1.

As a result, in the optical disk 100, recording marks RM formed of relatively small interference patterns are recorded in positions of the focal point Fb1 and Fb2 corresponding to the rear side of the target track in the recording layer 101.

At this point, in the recording layer 101, the blue light beams Lb1 and Lb2, both of which are formed by converging light, overlap, a standing wave is generated in a portion having intensity equal to or higher than predetermined intensity, and the recording mark RM is formed. Therefore, as shown in FIG. 2A, the recording mark RM generally assumes a shape obtained by sticking two cones together on bottom surfaces thereof and the center of the recording mark RM is slightly narrow in the center (a portion where the bottom surfaces are stuck together).

Concerning the recording mark RM, a diameter RMr of the narrowed portion in the center is calculated according to the following Equation (1) when a wavelength of the blue light beams Lb1 and Lb2 is λ [m] and a numerical aperture of the object lenses OL1 and OL2 is NA.

$$RMr = 1.2 \times \lambda / NA \qquad (1)$$

Height RMh of the recording mark RM is calculated according to the following Equation (2) when a refractive index of the object lenses OL1 and OL2 is n.

$$RMh = 4 \times n \times \lambda / NA^2 \qquad (2)$$

For example, when the wavelength λ is 405 [nm], the numerical aperture NA is 0.5, and the refractive index n is 1.5, the diameter RMr is calculated as 0.97 [μm] from Equation (1) and the height RMh is calculated as 9.72 [μm] from Equation (2).

Figure 2B:
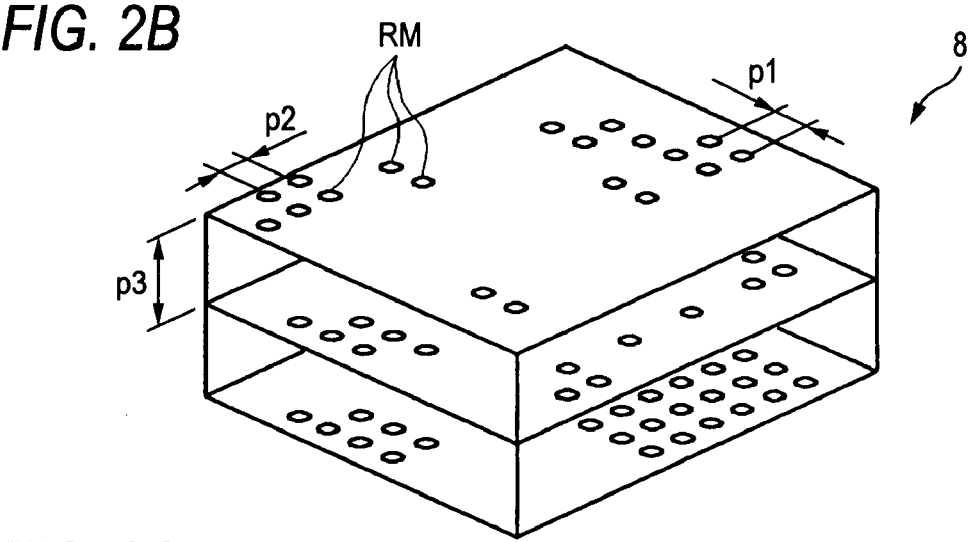
Figure 2C:
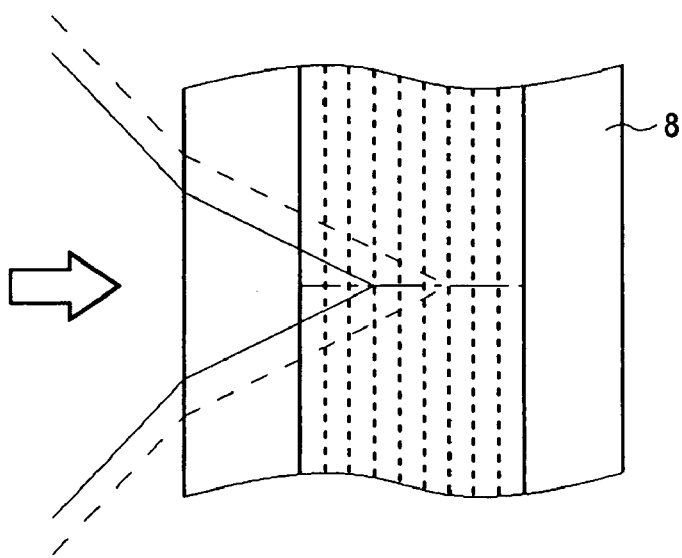

The optical disk 100 is designed such that the thickness t1 (=0.3 [mm]) of the recording layer 101 is sufficiently larger than the height RMh of the recording mark RM. Therefore, in the optical disk 100, the recording mark RM is recorded while a distance from the reflective and transmissive film 104 in the recording layer 101 (hereinafter referred to as depth) is changed. Consequently, recording in multiple layers formed by superimposing plural mark recording layers in a thickness direction of the optical disk 100 as shown in FIG. 2B can be performed.

In this case, in the recording layer 101 of the optical disk 100, when the depth of the focal point Fb1 and Fb2 of the blue light beams Lb1 and Lb2 is adjusted, the depth of the recording mark RM is changed. For example, the optical disk 100 can be configured such that, if a distance p3 between the mark recording layers is set to about 15 [μm] taking into account mutual interference and the like of the recording marks RM, mark recording layers including about twenty layers are formed in the recording layer 101. The distance p3 may be set to various values other than about 15 [μm] taking into account the mutual interference and the like of the recording marks RM.

On the other hand, in the optical disk 100, when information is reproduced therefrom, in the same manner as the recording of the information, the object lens OL1 is subjected to position control to focus the red light beam Lr1 condensed by the object lens OL1 on the target track of the reflective and transmissive film 104.

In the optical disk 100, the focal point Fb1 of the blue light beam Lb1, which has passed through the identical object lens OL1 and is transmitted through the substrate 102 and the reflective and transmissive film 104, is focused in a position corresponding to a "rear side" of the target track in the recording layer 101 and at a target depth (hereinafter referred to as target mark position).

In this case, because of the characteristic of the hologram, the recording mark RM recorded in the position of the focal point Fb1 generates the blue reproduced light beam Lb3 from the recording mark RM recorded in the target mark position. The blue reproduced light beam Lb3 has an optical characteristic equivalent to that of the blue light beam Lb2 irradiated during the recording of the recording marks RM. The blue reproduced light beam Lb3 travels in a direction same as that of the blue light beam Lb2, i.e., from the inside of the recording layer 101 to the substrate 102 side while diverging.

As described above, in the optical disk 100, when information is recorded therein, since the red light beam Lr1 for position control and the blue light beams Lb1 and Lb2 for information recording are used, the recording mark RM is formed as the information in the position where the focal points Fb1 and Fb2 overlap in the recording layer 101, i.e., the target mark position on the rear side of the target track in the reflective and transmissive film 104 and at the target depth.

In the optical disk 100, when recorded information is reproduced therefrom, since the red light beam Lr1 for position control and the blue light beam Lb1 for information reproduction are used, the blue light reproduced light beam Lb3 is generated from the recording mark RM recorded in the position of the focal point Fb1, i.e., the target mark position.

(1-2) Structure of an Optical Disk Apparatus

Figure 4:
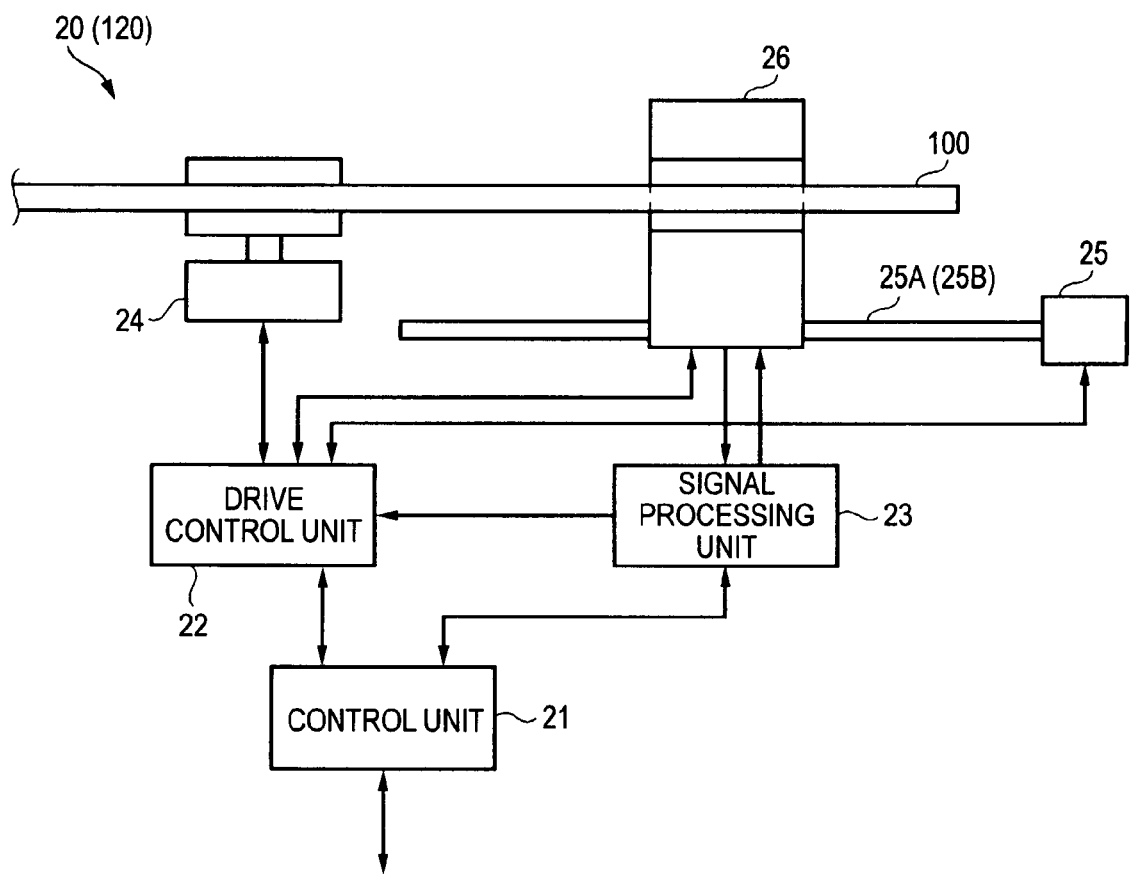
FIG. 4 is a schematic diagram showing a structure of an optical disk apparatus according to the embodiment of the present invention.

An optical disk apparatus 20 corresponding to the optical disk 100 is explained. The entire optical disk apparatus 20 is collectively controlled by a control unit 21 as shown in FIG. 4.

The control unit 21 mainly includes a not-shown CPU (Central Processing Unit). The control unit 21 reads out various programs such as a basic program and an information recording program from a not-shown ROM (Read Only Memory) and expands the programs in a not-shown RAM (Random Access Memory) to thereby execute various kinds of processing such as information recording processing.

For example, the control unit 21 receives an information recording command, recording information, and recording address information from a not-shown external apparatus or the like in a state in which the optical disk 100 is inserted in the optical disk apparatus 20. Then, the control unit 21 supplies a drive command and the recording address information to a drive control unit 22 and supplies the recording information to a signal processing unit 23. The recording address information is information indicating an address in which the recording information should be recorded among addresses affixed to the recording layer 101 of the optical disk 100.

The drive control unit 22 rotates the optical disk 100 at predetermined rotation speed by subjecting a spindle motor 24 to drive control according to the drive command. The drive control unit 22 moves an optical pickup 26 to a position corresponding to the recording address information in a radial direction (i.e., an inner peripheral direction or an outer peripheral direction) of the optical disk 100 along moving shafts 25A and 25B by subjecting a thread motor 25 to drive control according to the drive command.

The signal processing unit 23 generates a recording signal by applying various kinds of signal processing such as predetermined coding processing and modulation processing to the supplied recording information and supplies the recording signal to the optical pickup 26.

Figure 5:
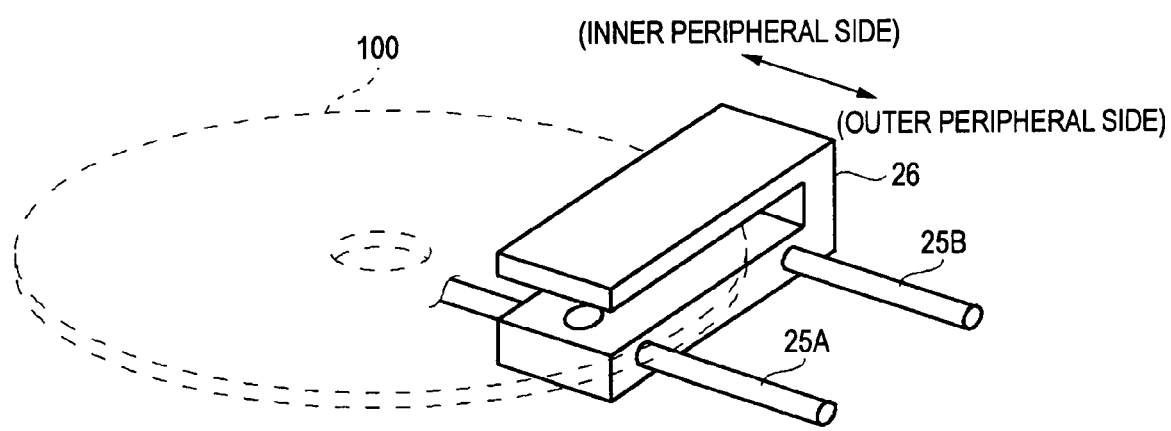
FIG. 5 is a schematic diagram showing the external structure of an optical pickup.

As shown in FIG. 5, the optical pickup 26 is formed in a substantially C shape in a side view. As shown in FIG. 3B, the optical pickup 26 can focus on the optical disk 100 from both the sides thereof and irradiate a light beam thereon.

The optical pickup 26 performs focus control and tracking control on the basis of the control by the drive control unit 22 (FIG. 4) to thereby set an irradiation position of a light beam in a track indicated by the recording address information (hereinafter referred to as target track) in the recording layer 101 of the optical disk 100 and record the recording mark RM corresponding to a recording signal from the signal processing unit 23 (this is described later in detail).

When the control unit 21 receives information reproduction command and reproduction address information indicating an address of the recording information from, for example, an external apparatus (not shown), the control unit 21 supplies a drive command to the drive control unit 22 and supplies a reproduction processing command to the signal processing unit 23.

As in the recording of information, the drive control unit 22 rotates the optical disk 100 at the predetermined rotation speed by subjecting the spindle motor 24 to the drive control and moves the optical pickup 26 to a position corresponding to the reproduction address information by subjecting the thread motor 25 to the drive control.

The optical pickup 26 performs focus control and tracking control on the basis of the control by the drive control unit 22 (FIG. 4) to thereby set an irradiation position of a light beam in a track indicated by the reproduction address information (i.e., target track) in the recording layer 101 of the optical disk 100 and irradiate a light beam of a predetermined amount of light. At this point, the optical pickup 26 detects a reproduced light beam generated from the recording mark RM of the recording layer 101 in the optical disk 100 and supplies a detection signal corresponding to an amount of light of the reproduced light beam to the signal processing unit 23 (this is described in detail later).

The signal processing unit 23 generates reproduction information by applying various kinds of signal processing such as predetermined demodulation processing and decoding processing to the supplied detection signal and supplies this reproduction signal to the control unit 21. The control unit 21 transmits the reproduction information to an external apparatus (not shown).

As described above, the optical disk apparatus 20 controls the optical pickup 26 with the control unit 21 to thereby record information in the target track in the recording layer 101 of the optical disk 100 and reproduce information from the target track.

(1-3) Structure of the Optical Pickup

Figure 6:
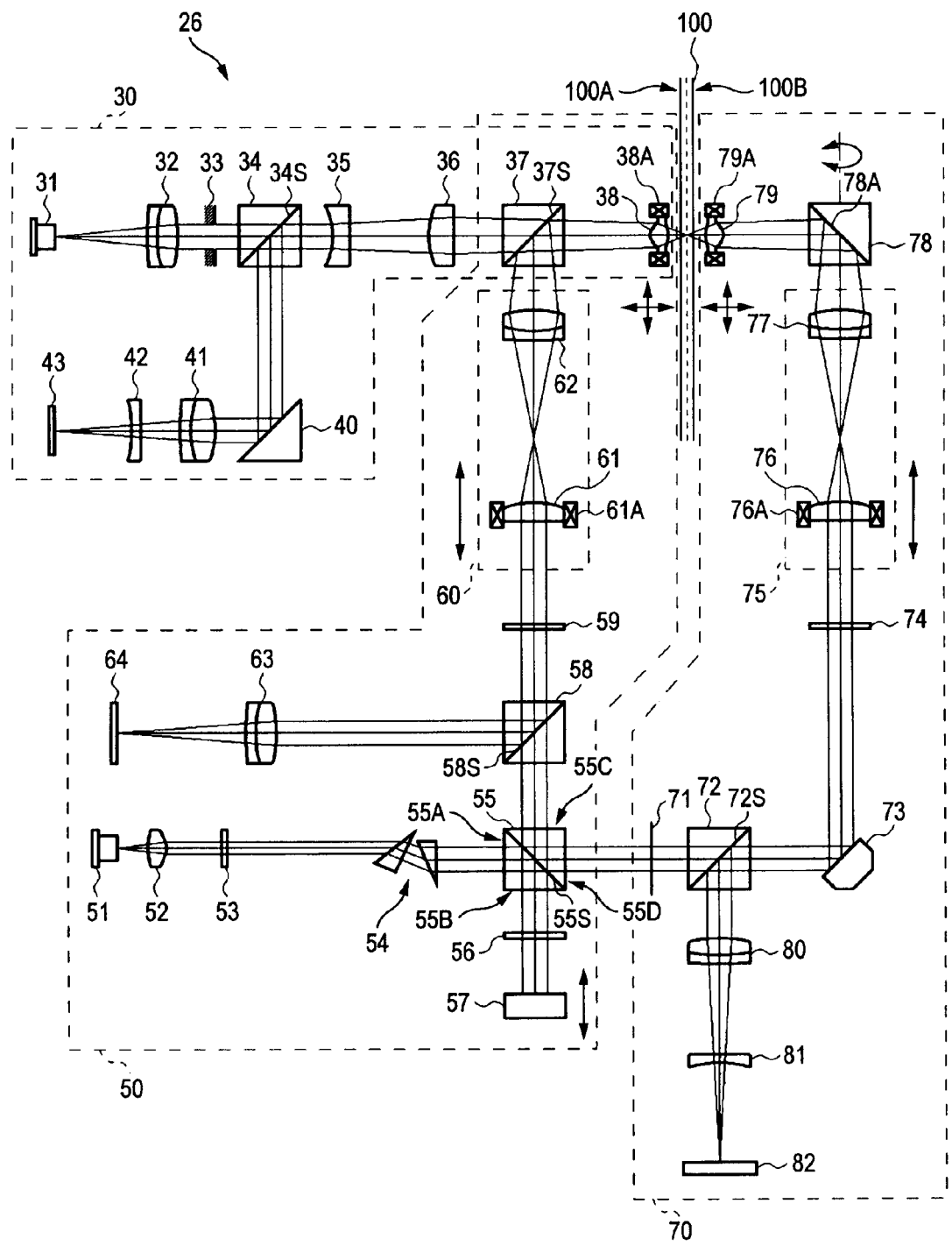
FIG. 6 is a schematic diagram showing the structure of the optical pickup.

The structure of the optical pickup 26 is explained. As schematically shown in FIG. 6, the optical pickup 26 includes a large number of optical components. The optical components are roughly divided into a guide-surface-position control optical system 30, a guide-surface-information optical system 50, and a recording-light-irradiation-surface optical system 70.

(1-3-1) Structure of a Guide-Surface-Red-Light Optical System

The guide-surface-position-control optical system 30 irradiates the red light beam Lr1 on the guide surface 100A of the optical disk 100 and receives the red reflected light beam Lr2, which is a reflected light beam of the red light beam Lr1 reflected on the optical disk 100.

Figure 7:
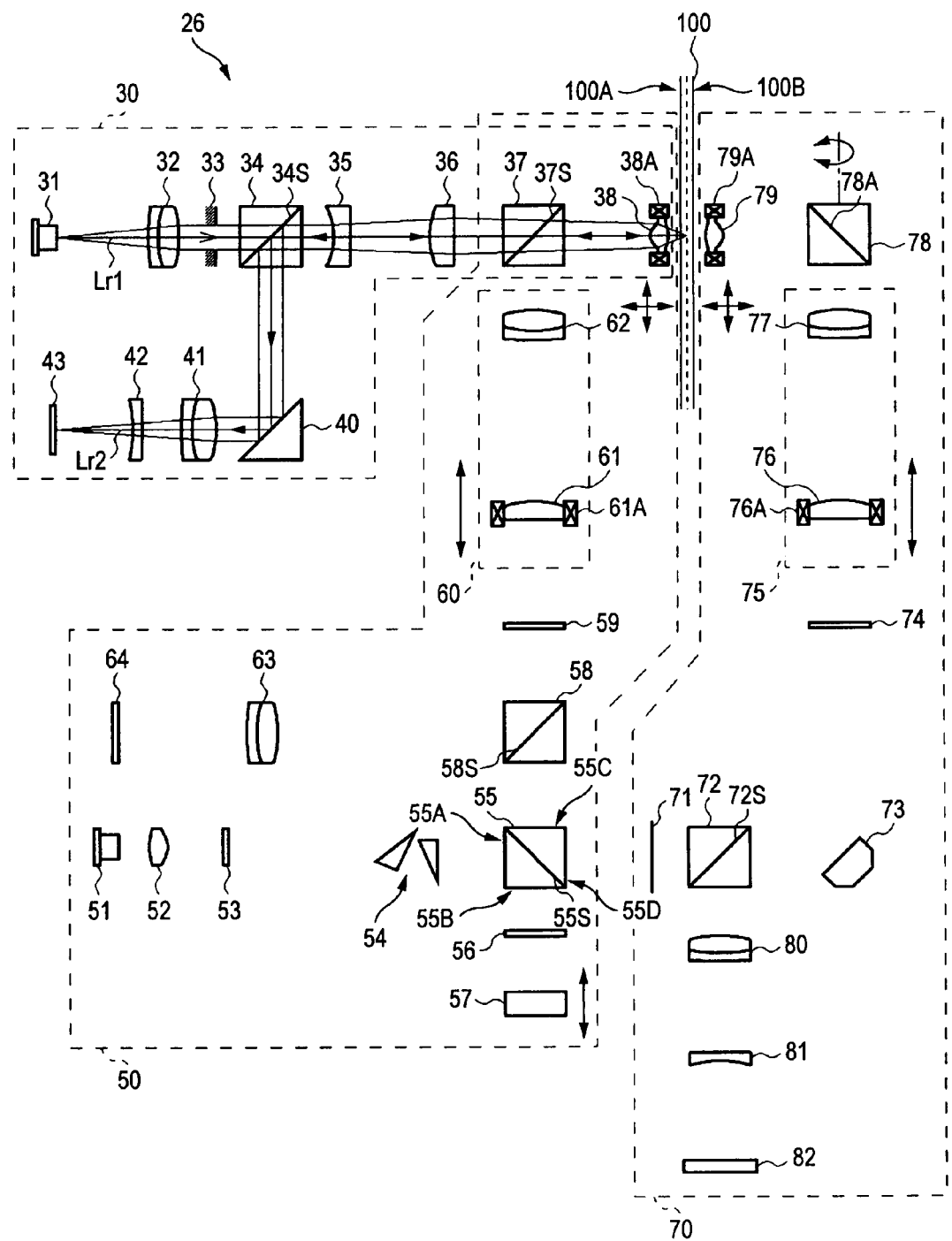
FIG. 7 is a schematic diagram showing an optical path of a red light beam.

In FIG. 7, a laser diode 31 of the guide-surface-position-control optical system 30 can emit a red laser beam having a wavelength of about 660 [nm]. Practically, the laser diode 31 emits the red light beam Lr1 of a predetermined amount of light, which is formed by diverging light, on the basis of the control by the control unit 21 (FIG. 4) and makes the red light beam Lr1 incident on a collimator lens 32. The collimator lens 32 converts the red light beam Lr1 from the diverging light into parallel light and makes the red light beam Lr1 incident on a no-polarization beam splitter 34 via a slit 33.

The no-polarization beam slitter 34 transmits the red light beam Lr1 through a reflective and transmissive surface 34A at a ratio of about 50% and makes the red light beam Lr1 incident on a correction lens 35. Correction lenses 35 and 36 once diverge and then converge the red light beam Lr1 and make the red light beam Lr1 incident on a dichroic prism 37.

A reflective and transmissive surface 37S of the dichroic prism 37 has so-called wavelength selectivity. In other words, transmittance and reflectance are different depending on a wavelength of a light beam. The reflective and transmissive surface 37S transmits a red light beam at a ratio of nearly 100% and reflects a blue light beam at a ratio of nearly 100%. Therefore, the dichroic prism 37 transmits the red light beam Lr1 through the reflective and transmissive surface 37S and makes the red light beam Lr1 incident on an object lens 38.

The object lens 38 condenses the red light beam Lr1 and irradiates the red light beam Lr1 to the guide surface 100A of the optical disk 100. At this point, as shown in FIG. 3B, the red light beam Lr1 is transmitted through the substrate 102 and reflected on the reflective and transmissive film 104 and changes to the red reflected light beam Lr2 traveling in a direction opposite to the direction of the red light beam Lr1.

The object lens 38 is designed to be optimized to the blue light beam Lb1. Concerning the red light beam Lr1, the object lens 38 acts as a condenser lens having a numerical aperture (NA) of 0.41 because of a relation of an optical distance and the like between the slit 33 and the correction lenses 35 and 36.

Thereafter, the red reflected light beam Lr2 is sequentially transmitted through the object lens 38, the dichroic prism 37, and the correction lenses 36 and 35 to be changed to parallel light and is then made incident on the no-polarization beam splitter 34.

The no-polarization beam splitter 34 irradiates the red reflected light beam Lr2 on a mirror 40 by reflecting the red reflected light beam Lr2 at a ratio of about 50%, reflects the red reflected light beam Lr2 again with the mirror 40, and then makes the red reflected light beam Lr2 incident on the condenser lens 41.

The condenser lens 41 converges the red reflected light beam Lr2 and irradiates the red reflected light Lr2 on a photodetector 43 after giving astigmatism to a cylindrical lens 42.

In the optical disk apparatus 20, it is likely that wobble and the like in the rotating optical disk 100 occur. Thus, it is likely that a relative position of a target track with respect to the guide-surface-position-control optical system 30 fluctuates.

Therefore, to cause the focal point Fr (FIG. 3B) of the red light beam Lr1 to follow the target track in the guide-surface-position control optical system 30, it is necessary to move the focal point Fr in a focus direction, which is a direction toward or away from the optical disk 100, and a tracking direction, which is an inner peripheral side direction or an outpour peripheral side direction of the optical disk 100.

Thus, the object lens 38 can be driven in two axial directions, the focus direction and the tracking direction, by a biaxial actuator 38A.

In the guide-surface-position control optical system 30 (FIG. 7), optical positions of various optical components are adjusted such that a focus state at the time when the red light beam Lr1 is condensed and irradiated on the reflective and transmissive film 104 of the optical disk 100 by the object lens 38 is reflected on a focus state at the time when the red reflected light beam Lr2 is condensed and irradiated on the photodetector 43 by the condenser lens 41.

Figure 8:
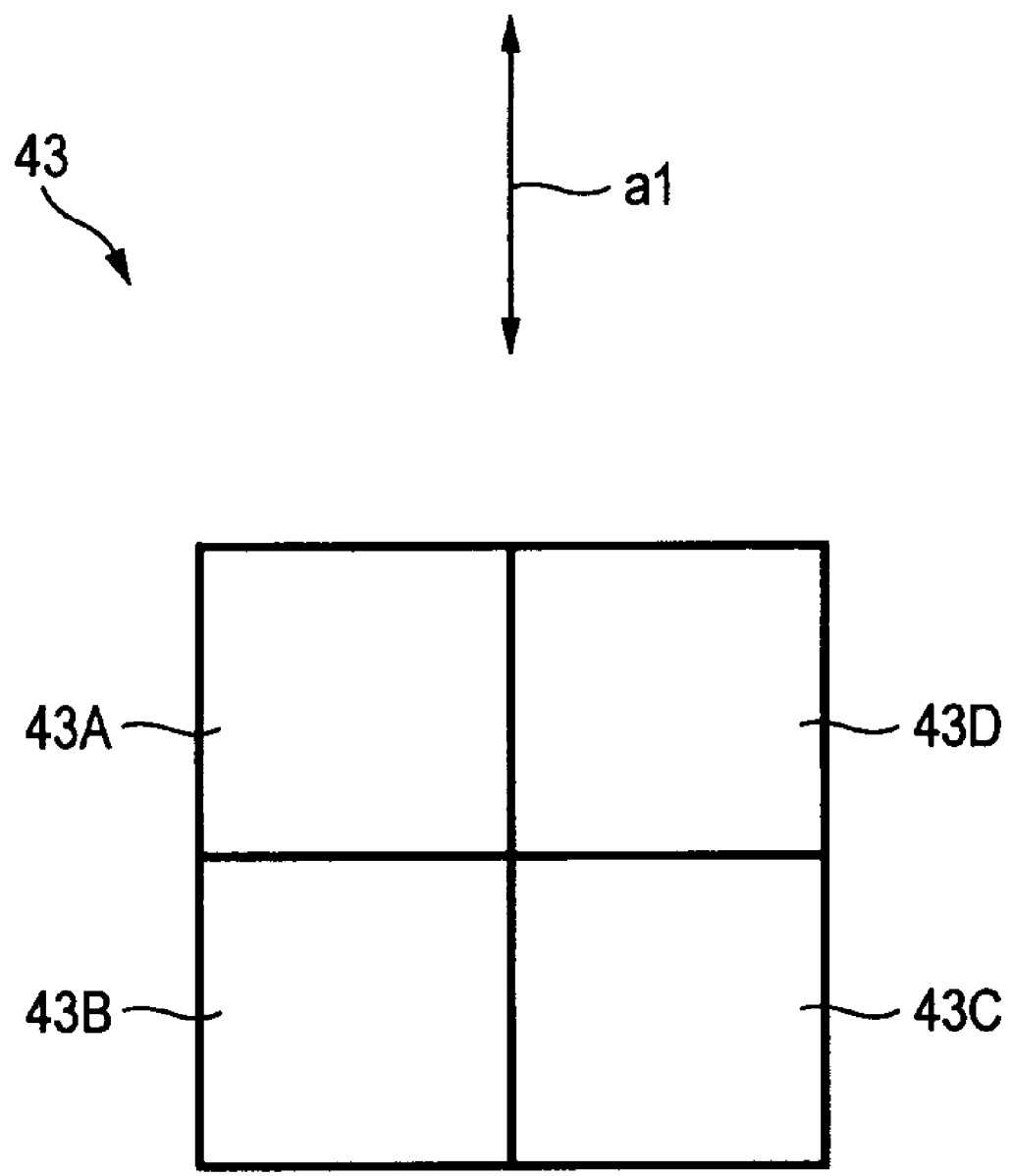
FIG. 8 is a schematic diagram showing the structure of detection areas in a photodetector.

As shown in FIG. 8, the photodetector 43 has four detection areas 43A, 43B, 43C, and 43D, which are divided in a lattice shape, on a surface on which the red reflected light beam Lr2 is irradiated. A direction indicated by an arrow a1 (a vertical direction in the figure) corresponds to a traveling direction of a track at the time when the red light beam Lr1 is irradiated on the reflective and transmissive film 104 (FIG. 3B).

The photodetector 43 detects parts of the red reflected light beam Lr2 with the detection areas 43A, 43B, 43C, and 43D, respectively. The photodetector 43 generates detection signals SDAr, SDBr, SDCr, and SDDr according to an amount of light detected at this point and transmits the detection signals to the signal processing unit 23 (FIG. 4).

The signal processing unit 23 performs focus control according to a so-called astigmatism method. The signal processing unit 23 calculates a focus error signal SFEr in accordance with the following Equation (3) and supplies the focus error signal SFEr to the drive control unit 22.

$$SFEr=(SDAr+SDCr)-(SDBr+SDDr) \quad (3)$$

The focus error signal SFEr represents an amount of shift between the focal point Fr of the red light beam Lr1 and the reflective and transmissive film 104 of the optical disk 100.

The signal processing unit 23 performs tracking control according to a so-called push-pull method. The signal processing unit 23 calculates a tracking error signal STEr in accordance with the following Equation (4) and supplies the tracking error signal STEr to the drive control unit 22.

$$STEr=(SDAr+SDDr)-(SDBr+SDCr) \quad (4)$$

The tracking error signal STEr represents an amount of shift between the focal point Fr of the red light beam Lr1 and the target track in the reflective and transmissive film 104 of the optical disk 100.

The drive control unit 22 generates a focus drive signal SFDr on the basis of the focus error signal SFEr and supplies the focus drive signal SFDr to the biaxial actuator 38A to thereby feedback-control (i.e., focus-control) the object lens 38 such that the red light beam Lr1 is focused on the reflective and transmissive film 104 of the optical disk 100.

The drive control unit 22 generates a tracking drive signal STDr on the basis of the tracking error signal STEr and supplies the tracking drive signal STDr to the biaxial actuator 38A to thereby feedback-control (i.e., tracking-control) the object lens 38 such that the red light beam Lr1 is focused on the target track in the reflective and transmissive film 104 of the optical disk 100.

As described above, the guide-surface-position control optical system 30 irradiates the red light beam Lr1 on the reflective and transmissive film 104 of the optical disk 100 and supplies a result of reception of the red reflected light beam Lr2, which is reflected light of the red light beam Lr1, to the signal processing unit 23. According to the result, the drive control unit 22 performs focus control and tracking control for the object lens 38 to focus the red light beam Lr1 on the target track in the reflective and transmissive film 104.

(1-3-2) Structure of a Guide Surface Blue Optical System

The guide-surface-information optical system 50 irradiates the blue light beam Lb1 on the guide surface 100A of the optical disk 100 and receives the blue light beam Lb2 or the blue reproduced light beam Lb3 made incident from the optical disk 100.

(1-3-2-1) Irradiation of a Blue Light Beam

Figure 9:
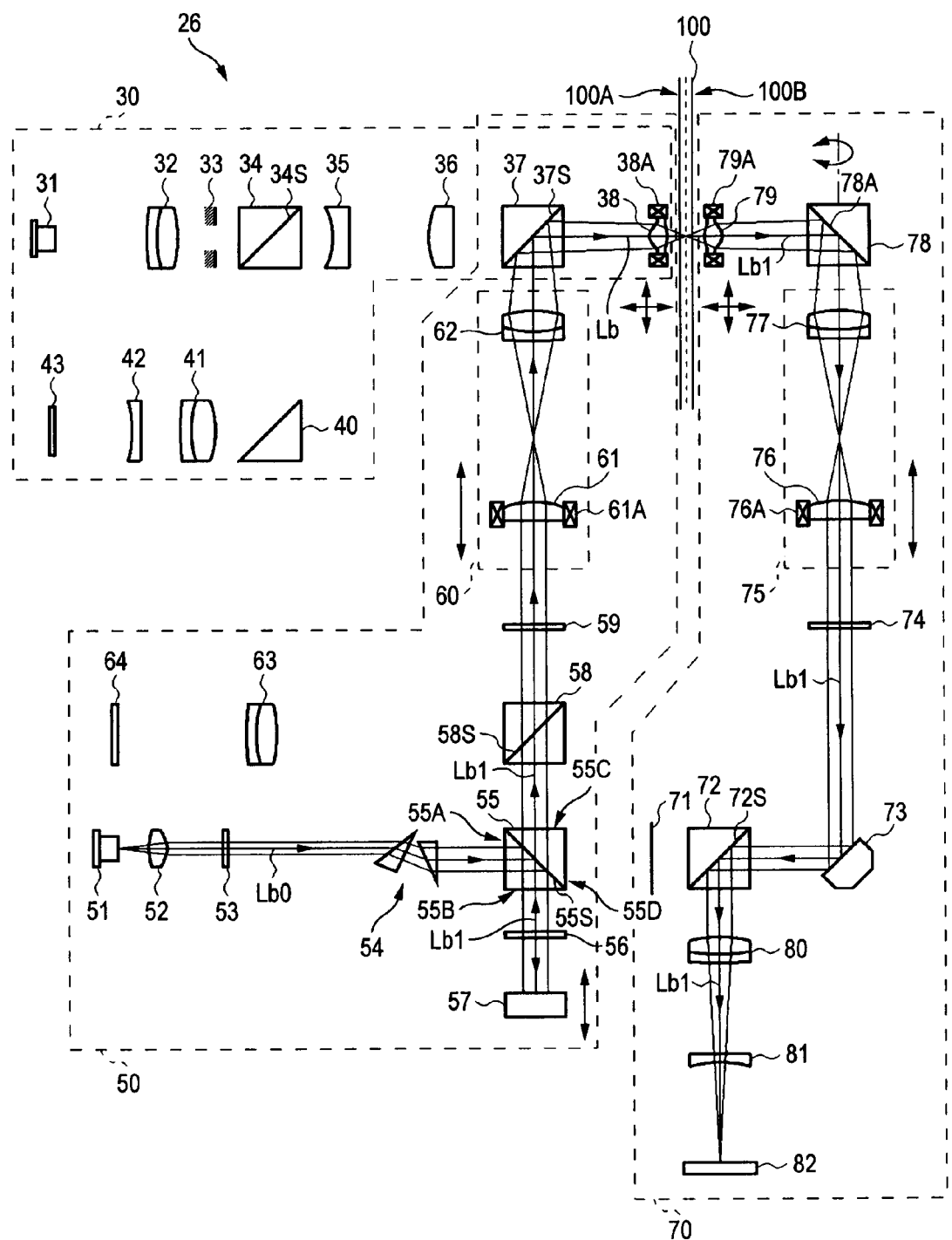
FIG. 9 is a schematic diagram showing an optical path (1) of a blue light beam.

In FIG. 9, the laser diode 51 of the guide-surface-information optical system 50 can emit a blue laser beam having a wavelength of about 405 [nm]. Practically, the laser diode 51 emits a blue light beam Lb0, which is formed by diverging light, on the basis of the control by the control unit 21 (FIG. 4) and makes the blue light beam Lb0 incident on the collimator lens 52. The collimator lens 52 converts the blue light beam Lb0 from the diverging light into parallel light and makes the blue light beam Lb0 incident on a half-wave plate 53.

At this point, after a polarization direction of the blue light beam Lb0 is rotated a predetermined angle by the half-wave plate 53 and an intensity distribution of the blue light beam Lb0 is formed by an anamorphic prism 54, the blue light beam Lb0 is made incident on a surface 55A of the polarization beam splitter 55.

The polarization beam splitter 55 reflects a light beam on the reflective and transmissive surface 55S or transmits the light beam through the reflective and transmissive surface 55S at a different ratio according to a polarization direction of the light beam. For example, the reflective and transmissive surface 55S reflects a light beam of p polarized light at a ratio of about 50% and transmits the remaining 50% of the light beam. The reflective and transmissive surface 55S transmits a light beam of s polarized light at a ratio of about 100%.

Practically, the polarization beam splitter 55 reflects the blue light beam Lb0 of the p polarized light at a ratio of about 50% on the reflective and transmissive surface 55S and makes the blue light beam Lb0 incident on a quarter-wave plate 56 from a surface 55B. The polarization beam splitter 55 transmits the remaining 50% of the blue light beam Lb0 through the reflective and transmissive surface 55S and makes the remaining 50% of the blue light beam Lb0 incident on a shutter 71 from the surface 55D. In the following explanation, the blue light beam reflected on the reflective and transmissive surface 55S is referred to as the blue light beam Lb1 and the blue light beam transmitted through the reflective and transmissive surface 55S is referred to as the blue light beam Lb2.

The quarter-wave plate 56 converts the blue light beam Lb1 from linear polarized light into circular polarized light and irradiates the blue light beam Lb1 on a movable mirror 57. The quarter-wave plate 56 converts the blue light beam Lb1 reflected by the movable mirror 57 from circular polarized light into linear polarized light and makes the blue light beam Lb1 incident on the surface 55B of the polarization beam splitter 55 again.

At this point, for example, the blue light beam Lb1 is converted from p polarized light into left circular polarized light by the quarter-wave plate 56, converted from the left circular polarized light into right circular polarized light when the blue light beam Lb1 is reflected by the movable mirror 57, and then converted from the right polarized light into s polarized light by the quarter-wave plate 56 again. This means that a polarization direction of the blue light beam Lb1 is different when the blue light beam Lb1 is emitted from the surface 55B and when the blue light beam Lb1 is made incident on the surface 55B after being reflected by the movable mirror 57.

The polarization beam splitter 55 directly transmits the blue light beam Lb1 through the reflective and transmissive surface 55S according to a polarization direction (s polarized light) of the blue light beam Lb1 made incident from the surface 55B and makes the blue light beam Lb1 incident on a polarization beam splitter 58 from a surface 55C.

As a result, an optical path length in the blue light beam Lb1 is extended by the guide-surface-information optical system 50, the polarization beam splitter 55, the quarter-wave plate 56, and the movable mirror 57.

For example, the reflective and transmissive surface 55S of the polarization beam splitter 58 reflects a light beam of p polarized light at a ratio of about 100% and transmits a light beam of an s polarized light at a ratio of about 100%. Practically, the polarization beam splitter 58 directly transmits the blue light beam Lb1 through the reflective and transmissive surface 58S and makes the blue light beam Lb1 incident on a relay lens 60 after converting the blue light beam Lb1 from linear polarized light (s polarized light) into circular polarized light (right circular polarized light) with the quarter-wave plate 59.

The relay lens 60 converts the blue light beam Lb1 from parallel light into converging light with a movable lens 61, converts the blue light beam Lb1, which has changed to diverging light after the convergence, into converging light again with a fixed lens 62, and makes the blue light beam Lb1 incident on the dichroic prism 37.

The movable lens 61 is moved in an optical axis direction of the blue light beam Lb1 by an actuator 61A. Practically, the relay lens 60 can change a convergence state of the blue light beam Lb1 emitted from the fixed lens 62 by moving the movable lens 61 with the actuator 61A on the basis of the control by the control unit 21 (FIG. 4).

The dichroic prism 37 reflects the blue light beam Lb1 on the reflective and transmissive surface 37S according to a wavelength of the blue light beam Lb1 and makes the blue light beam Lb1 incident on the object lens 38. When the blue light beam Lb1 is reflected on the reflective and transmissive surface 37S, a polarization direction in circular polarized light is reversed and, for example, the blue light beam Lb1 is converted from right circular polarized light into left circular polarized light.

The object lens 38 condenses the blue light beam Lb1 and irradiates the blue light beam Lb1 on the guide surface 100A of the optical disk 100. Concerning the blue light beam Lb1, the object lens 38 acts as a condenser lens having a numerical aperture (NA) of 0.5 because of a relation of an optical distance and the like between the object lens 38 and the relay lens 60.

In this case, as shown in FIG. 3B, the blue light beam Lb1 is transmitted through the substrate 102 and the reflective and transmissive film 104 and focused in the recording layer 101. A position of the focal point Fb1 of the blue light beam Lb1 is decided according to a convergence state of the blue light beam Lb1 emitted from the fixed lens 62 of the relay lens 60. In other words, the focal point Fb1 moves to the guide surface 100A side or the recording-light irradiation surface 100B side in the recording layer 101 according to a position of the movable lens 61.

Specifically, the guide-surface-information optical system 50 is designed such that a moving distance of the movable lens 61 and a moving distance of the focal point Fb1 of the blue light beam Lb1 are in a substantially proportional relation. For example, when the movable lens 61 is moved 1 [mm], the focal point Fb1 of the blue light beam Lb1 moves 30 [μm].

Practically, when a position of the movable lens 61 is controlled by the control unit 21 (FIG. 4), the guide-surface-information optical system 50 adjusts a depth d1 (i.e., a distance from the reflective and transmissive film 104) of the focal point Fb1 (FIG. 3B) of the blue light beam Lb1 in the recording layer 101 of the optical disk 100.

The blue light beam Lb1 changes to diverging light after converging on the focal point Fb1 and is transmitted through the recording layer 101 and the substrate 103, emitted from the recording-light irradiation surface 100B, and made incident on an object lens 79 (this is described later in detail).

As described above, the guide-surface-information optical system 50 irradiates the blue light beam Lb1 on the optical disk 100 from the guide surface 100A side thereof, locates the focal point Fb1 of the blue light beam Lb1 in the recording layer 101, and adjusts the depth d1 of the focal point Fb1 according to a position of the movable lens 61 in the relay lens 60.

(1-3-2-2) Reception of the Blue Light Beam

The optical disk 100 transmits the blue light beam Lb2 irradiated from the object lens 79 of the recording-light-irradiation-surface optical system 70 to the recording-light irradiation surface 100B and emits the blue light beam Lb2 from the guide surface 100A as diverging light (this is described later in detail). The blue light beam Lb2 is circular polarized light (e.g., right circular polarized light).

Figure 10:
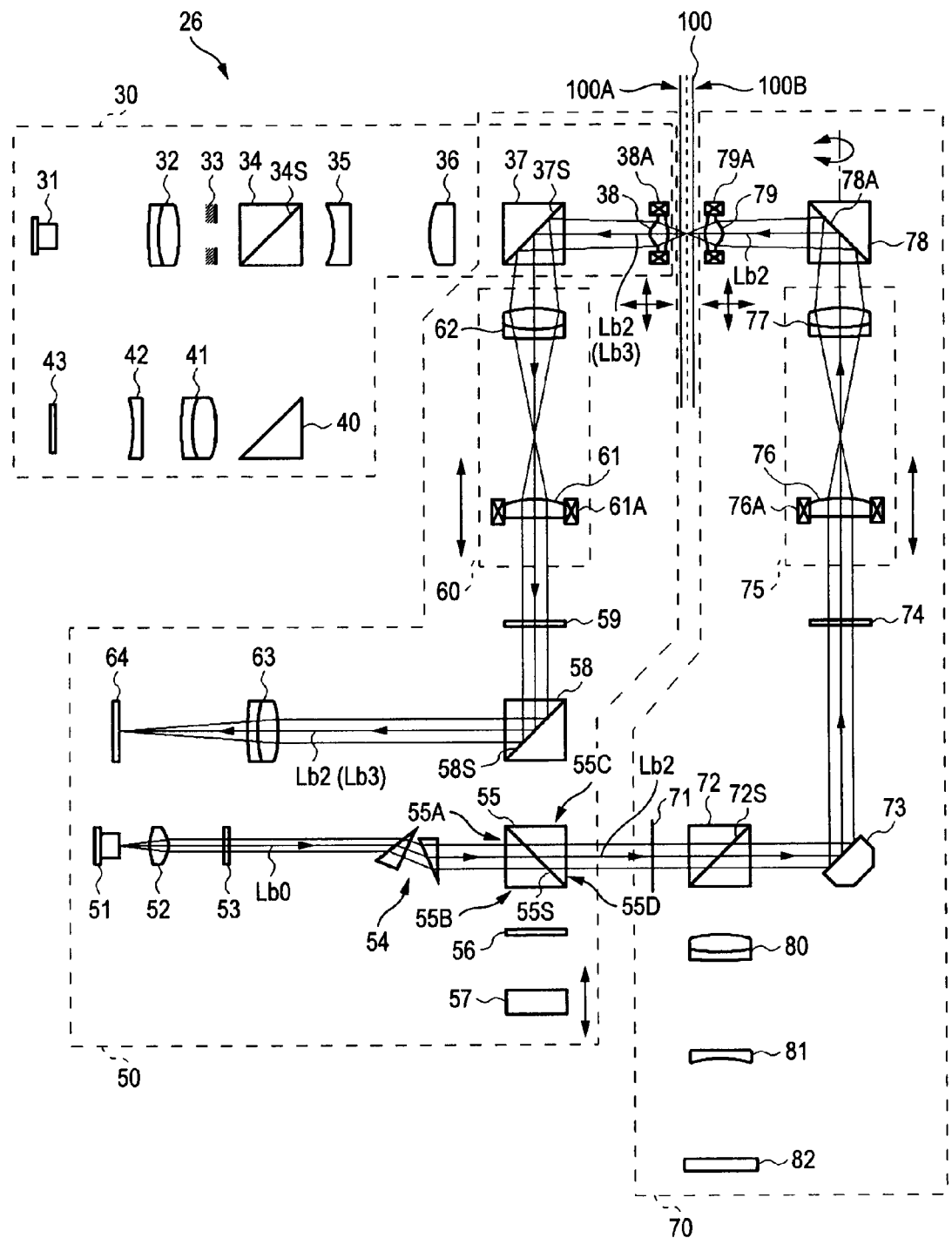
FIG. 10 is a schematic diagram showing an optical path (2) of the blue light beam.

In this case, in the guide-surface-information optical system 50, as shown in FIG. 10, after being converged to some extent by the object lens 38, the blue light beam Lb2 is reflected by the dichroic prism 37 and made incident on the relay lens 60. When the blue light beam Lb2 is reflected on the reflective and transmissive surface 37S, a polarization direction in the circular polarized light is reversed and, for example, the blue light beam Lb2 is converted from the right circular polarized light into left circular polarized light.

Subsequently, the blue light beam Lb2 is converted into parallel light by the fixed lens 62 and the movable lens 61 of the relay lens 60, converted from the circular polarized light (the left circular polarized light) into linear polarized light (p polarized light) by the quarter-wave plate 59, and then made incident on the polarization beam splitter 58.

The polarization beam splitter 58 reflects the blue light beam Lb2 according to a polarization direction of the blue light beam Lb2 and makes the blue light beam Lb2 incident on the condenser lens 63. The condenser lens 63 condenses the blue light beam Lb2 and irradiates the blue light beam Lb2 on the photodetector 64.

The respective optical components in the guide-surface-information optical system 50 are arranged such that the blue light beam Lb2 is focused on the photodetector 64.

The photodetector 64 detects an amount of light of the blue light beam Lb2, generates a reproduction detection signal SDp according to the amount of light detected at this point, and supplies the reproduction detection signal SDp to the signal processing unit 23 (FIG. 4).

However, the reproduction detection signal SDp generated according to the amount of light of the blue light beam Lb2 in the photodetector 64 has no use in particular. Therefore, the signal processing unit 23 (FIG. 4) does not specifically perform signal processing, although the reproduction detection signal SDp is supplied thereto.

On the other hand, when the recording mark RM is recorded in the recording layer 101, as described above, the optical disk 100 generates the blue reproduced light beam Lb3 from the recording mark RM because of the characteristic of a hologram when the focal point Fb1 of the blue light beam Lb1 is focused on the recording mark RM.

The blue reproduced light beam Lb3 is, under the principle of a hologram, reproduction of a light beam irradiated on the recording mark RM other than the blue light beam Lb1 when the recording mark RM is recorded, i.e., the blue light beam Lb2. Therefore, the blue reproduced light beam Lb3 is finally irradiated on the photodetector 64 by passing through an optical path same as that of the blue light beam Lb2 in the guide-surface-information optical system 50.

As described above, the respective optical components in the guide-surface-information optical system 50 are arranged such that the blue light beam Lb2 is focused on the photodetector 64. Therefore, the blue reproduced light beam Lb3 is focused on the photodetector 64 in the same manner as the blue light beam Lb2.

The photodetector 64 detects an amount of light of the blue light beam Lb3, generates the reproduction detection signal SDp according to the amount of light detected at this point, and supplies the reproduction detection signal SDp to the signal processing unit 23 (FIG. 4).

In this case, the reproduction detection signal SDp represents information recorded on the optical disk 100. Therefore, the signal processing unit 23 generates reproduction information by applying predetermined demodulation processing, decoding processing, and the like to the reproduction detection signal SDp and supplies this reproduction information to the control unit 21.

As described above, the guide-surface-information optical system 50 receives the blue light beam Lb2 and the blue light reproduced light beam Lb3 made incident on the object lens 38 from the guide surface 100A of the optical disk 100 and supplies a result of the light reception to the signal processing unit 23.

(1-3-3) Structure of the Recording-light-irradiation-surface Optical System

The recording-light-irradiation-surface optical system 70 (FIG. 6) irradiates the blue light beam Lb2 on the recording-light irradiation screen 100B of the optical disk 100 and receives the blue light beam Lb1 irradiated from the guide-surface-information optical system 50 and transmitted through the optical disk 100.

(1-3-3-1) Irradiation of the Blue Light Beam

In FIG. 10, as described above, the polarization beam splitter 55 of the guide-surface-information optical system 50 transmits the blue light beam Lb0, which is formed by the p polarized light, through the reflective and transmissive surface 55S at a ratio of about 50% and makes the blue light beam Lb0 incident on the shutter 71 from the surface 55D as the blue light beam Lb2.

The shutter 71 shuts out or transmits the blue light beam Lb2 on the basis of the control by the control unit 21 (FIG. 4). When the blue light beam Lb2 is transmitted, the shutter 71 makes the blue light beam Lb2 incident on a polarization beam splitter 72.

As the shutter 71, it is possible to use, for example, a mechanical shutter that shuts out or transmits the blue light beam Lb2 by mechanically moving a shut-out plate that shuts out the blue light beam Lb2 and a liquid crystal shutter that shuts out or transmits the blue light beam Lb2 by changing a voltage applied to a liquid crystal panel.

For example, a reflective and transmissive surface 72S of the polarization beam splitter 72 transmits a light beam of p polarized light at a ratio of about 100% and reflects a light beam of s polarized light at a ratio of about 100%. Practically, the polarization beam splitter 72 directly transmits the blue light beam Lb2, which is formed by p polarized light and, after reflecting the blue light beam Lb2 with the a mirror 73, converts the blue light beam Lb2 from linear polarized light (p polarized light) into circular polarized light (left circular polarized light) with a quarter-wave plate 74, and then makes the blue light beam Lb2 incident on a relay lens 75.

The relay lens 75 has the structure same as that of the relay lens 60. The relay lens 75 includes a movable lens 76, an actuator 76A, and a fixed lens 77 corresponding to the movable lens 61, the actuator 61A, and the fixed lens 62, respectively.

The relay lens 75 converts the blue light beam Lb2 from parallel light into converging light with the movable lens 76, converts the blue light beam Lb2, which has changed to diverging light after the convergence, into converging light again with the fixed lens 77, and makes the blue light beam Lb2 incident on a galvano mirror 78.

Like the relay lens 60, the relay lens 75 can change a convergence state of the blue light beam Lb2, which is emitted from the fixed lens 77, by moving the movable lens 76 with the actuator 76A on the basis of the control by the control unit 21 (FIG. 4).

The galvano mirror 78 reflects the blue light beam Lb2 and makes the blue light beam Lb2 incident on the object lens 79. When the blue light beam Lb2 is reflected, a polarization direction in circular polarized light is reversed and, for example, the blue light beam Lb2 is converted from left circular polarized light into right circular polarized light.

The galvano mirror 78 can change an angle of a reflection surface 78A. The galvano mirror 78 can adjust a traveling direction of the blue light beam Lb2 by adjusting the angle of the reflection surface 78A in accordance with the control by the control unit 21 (FIG. 4).

The object lens 79 is integral with a biaxial actuator 79A. Like the object lens 38, the object lens 79 can be moved in two axial directions, i.e., a focus direction that is a direction toward or away from the optical disk 100 and a tracking direction that is an inner peripheral side direction or an outer peripheral side direction of the optical disk 100, by the biaxial actuator 79A.

The object lens 79 condenses the blue light beam Lb2 and irradiates the blue light beam Lb2 on the recording-light irradiation surface 100B of the optical disk 100. The object lens 79 has an optical characteristic same as that of the object lens 38. Concerning the blue light beam Lb2, the object lens 79 acts as a condenser lens having a numerical aperture (NA) of 0.5 according to a relation of an optical distance or the like between the object lens 79 and the relay lens 75.

In this case, as shown in FIG. 3B, the blue light beam Lb2 is transmitted through the substrate 103 and focused in the recording layer 101. A position of the focal point Fb2 of the blue light beam Lb2 is decided according to a convergence state at the time when the blue light beam Lb2 is emitted from the fixed lens 77 of the relay lens 75. In other words, like the focal point Fb1 of the blue light beam Lb1, the focal point Fb2 moves to the guide surface 100A side or the recording-light irradiation surface 100B side in the recording layer 101 according to a position of the movable lens 76.

Specifically, like the guide-surface-information optical system 50, the recording-light-irradiation-screen optical system 70 is designed such that a moving distance of the movable lens 76 and a moving distance of the focal point Fb2 of the blue light beam Lb2 are in a substantially proportional relation. For example, when the movable lens 76 is moved 1 [mm], the focal point Fb2 of the blue light beam Lb2 moves 30 [μm].

Practically, when a position of the movable lens 76 in the relay lens 75 is controlled by the control unit 21 (FIG. 4) together with a position of the movable lens 61 in the relay lens 60, the recording-light-irradiation-surface optical system 70 adjusts a depth d2 of the focal point Fb2 (FIG. 3B) of the blue light beam Lb2 in the recording layer 101 of the optical disk 100.

In this case, in the optical disk apparatus 20, the control unit 21 (FIG. 4) adjusts the focal point Fb2 of the blue light beam Lb2 at the time when the object lens 79 is in a reference position to the focal point Fb1 of the blue light beam Lb1 at the time when the object lens 38 is in a reference position in the recording layer 101 when it is assumed that wobble or the like does not occur in the optical disk 100 (i.e., in an ideal state).

After focusing at the focal point Fb2, the blue light beam Lb2 is transmitted through the recording layer 101, the reflective and transmissive film 104, and the substrate 102 while diverging, emitted from the guide surface 100A, and made incident on the object lens 38.

As described above, the recording-light-irradiation-surface optical system 70 irradiates the blue light beam Lb2 on the optical disk 100 from the recording-light irradiation surface 100B side thereof, locates the focal point Fb2 of the blue light beam Lb2 in the recording layer 101, and adjusts the depth d2 of the focal point Fb2 according to a position of the movable lens 76 in the relay lens 75.

(1-3-3-2) Reception of the Blue Light Beam

As described above, the blue light beam Lb1 irradiated from the object lens 38 of the guide-surface-information optical system 50 (FIG. 9) once converges in the recording layer 101 of the optical disk 100 and then changes to diverging light and is made incident on the object lens 79.

At this point, in the recording-light-irradiation-surface optical system 70, after being converged to some extent by the object lens 79, the blue light beam Lb1 is reflected by the galvano mirror 78 and made incident on the relay lens 75. When the blue light beam Lb1 is reflected on the reflection surface 78S, a polarization direction in circular polarized light is reversed and, for example, the blue light beam Lb1 is converted from left circular polarized light into right circular polarized light.

Subsequently, the blue light beam Lb1 is converted into parallel light by the fixed lens 62 and the movable lens 61 of the relay lens 75, converted from the circular polarized light (the right circular polarized light) into linear polarized light (s polarized light) by the quarter-wave plate 74, and then, after being reflected by the mirror 73, made incident on the polarization beam splitter 72.

The polarization beam splitter 72 reflects the blue light beam Lb1 according to a polarization direction of the blue light beam Lb1 and makes the blue light beam Lb1 incident on a condenser lens 80. The condenser lens 80 converges the blue light beam Lb1 and irradiates the blue light beam Lb1 on a photodetector 82 after giving astigmatism to the blue light beam Lb1 with a cylindrical lens 81.

However, actually, it is likely that wobble or the like occurs in the optical disk 100. Therefore, as described above, the object lens 38 is subjected to focus control and tracking control by the guide-surface-position control optical system 30, the drive control unit 22 (FIG. 4), and the like.

In this case, since the focal point Fb1 of the blue light beam Lb1 moves following the movement of the object lens 38, the focal point Fb1 shifts from a position of the focal point Fb2 in the blue light beam Lb2 at the time when the object lens 79 is in the reference position.

Thus, in the recording-light-irradiation-surface optical system 70, optical positions of the various optical components are adjusted such that an amount of shift of the focal point Fb2 of the blue light beam Lb2 with respect to the focal point Fb1 of the blue light beam Lb1 in the recording layer 101 is reflected on an irradiation state of the blue light beam Lb1 condensed by the condenser lens 80 and irradiated on the photodetector 82.

Figure 11:
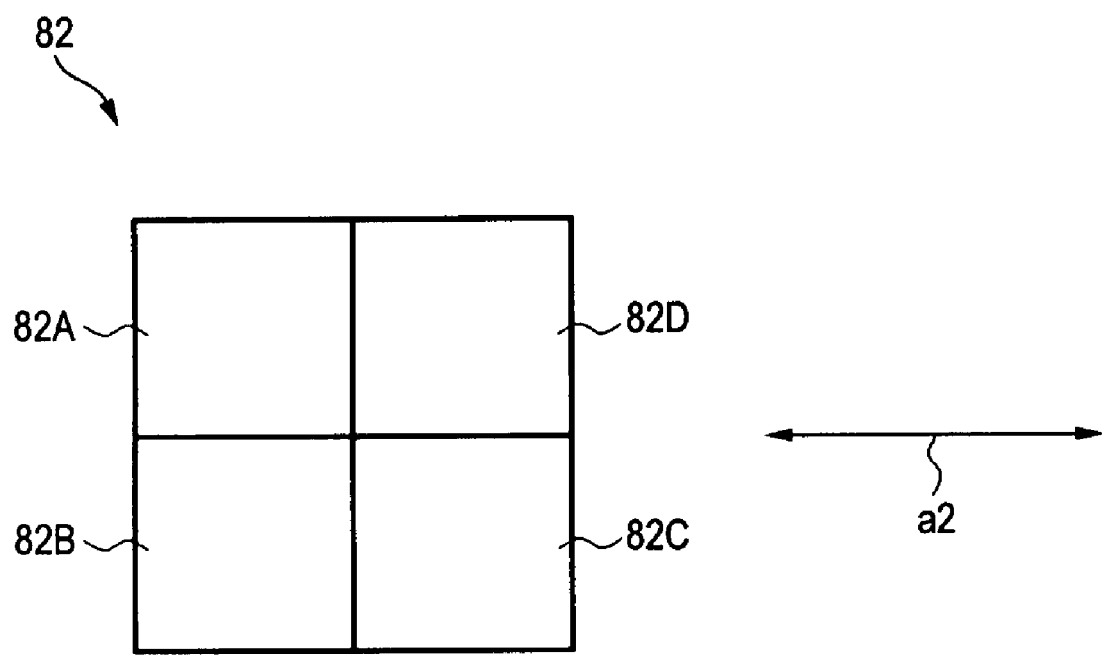
FIG. 11 is a schematic diagram showing the structure of detection areas in a photodetector.

As shown in FIG. 11, like the photodetector 43, the photodetector 82 has four detection areas 82A, 82B, 82C, and 82D, which are divided in a lattice shape, on a surface on which the blue light beam Lb1 is irradiated. A direction indicated by an arrow a2 (a horizontal direction in the figure) corresponds to a traveling direction of the track in the reflective and transmissive film 104 (FIG. 3B) at the time when the blue light beam Lb1 is irradiated.

The photodetector 82 detects parts of the blue light beam Lb1 with the detection areas 82A, 82B, 82C, and 82D, respectively, generates detection signals SDAb, SDBb, SDCb, and SDDb according to an amount of light detected at this point, and transmits the detection signals to the signal processing unit 23 (FIG. 4).

The signal processing unit 23 performs focus control according to a so-called astigmatism method. The signal processing unit 23 calculates a focus error signal SFEb in accordance with the following Equation (5) and supplies the focus error signal SFEb to the drive control unit 22.

$$SFEb=(SDAb+SDCb)-(SDBb+SDDb) \quad (5)$$

The focus error signal SFEb represents an amount of shift in a focus direction between the focal point Fb1 of the blue light beam Lb1 and the focal point Fb2 of the blue light beam Lb2.

The signal processing unit 23 performs tracking control using a push-pull signal. The signal processing unit 23 calculates a tracking error signal STEb in accordance with the following Equation (6) and supplies the tracking error signal STEb to the drive control unit 22.

$$STEb=(SDAb+SDBb)-(SDCb+SDDb) \quad (6)$$

The tracking error signal STEb represents an amount of shift in a tracking direction between the focal point Fb1 of the blue light beam Lb1 and the focal point Fb2 of the blue light beam Lb2.

The signal processing unit 23 generates a tangential error signal necessary for tangential control. The tangential control is a control for moving the focal point Fb2 of the blue light beam Lb2 to a target position in a tangential direction (i.e., a tangential direction of a track).

Specifically, the signal processing unit 23 performs the tangential control using a push-pull signal. The signal processing unit 23 calculates a tangential error signal SNEb in accordance with the following Equation (7) and supplies the tangential error signal SNEb to the drive control unit 22.

$$SNEb=(SDAb+SDDb)-(SDBb+SDCb) \quad (7)$$

The tangential error signal SNEb represents an amount of shift in the tangential direction between the focal point Fb1 of the blue light beam Lb1 and the focal point Fb2 of the blue light beam Lb2.

The drive control unit 22 generates a focus drive signal SFDb on the basis of the focus error signal SFEb and supplies the focus drive signal SFDb to the biaxial actuator 79A to thereby subject the object lens 79 to focus control to reduce an amount of shift in the focus direction of the focal point Fb2 of the blue light beam Lb2 with respect to the focal point Fb1 of the blue light beam Lb1.

The drive control unit 22 generates a tracking drive signal STDb on the basis of the tracking error signal STEb and supplies the tracking drive signal STDb to the biaxial actuator 79A to thereby subject the object lens 79 to tracking control to reduce an amount of shift in the tracking direction of the focal point Fb2 of the blue light beam Lb2 with respect to the focal point Fb1 of the blue light beam Lb1.

The drive control unit 22 generates a tangential drive signal SNDb on the basis of the tangential error signal SNEb and supplies the tangential drive signal SNDb to the galvano mirror 78 to thereby perform tangential control for adjusting an angle of the reflection surface 78A in the galvano mirror 78 to reduce an amount of shift in the tangential direction of the focal point Fb2 of the blue light beam Lb2 with respect to the focal point Fb1 of the blue light beam Lb1.

As described above, the recording-light-irradiation-surface optical system 70 receives the blue light beam Lb1 made incident on the object lens 79 from the recording-light irradiation surface 100B of the optical disk 100 and supplies a result of the light reception to the signal processing unit 23. According to the result, the drive control unit 22 applies focus control, tracking control, and tangential control by the galvano mirror 78 to the object lens 79 to adjust the focal point Fb2 of the blue light beam Lb2 to the focal point Fb1 of the blue light beam Lb1.

(1-3-4) Adjustment of an Optical Path Length

As described above, in recording information, the optical pickup 26 of the optical disk apparatus 20 separates the blue light beams Lb1 and Lb2 from the blue light beam Lb0 with the polarization beam splitter 55 (FIG. 9) and causes the blue light beams Lb1 and Lb2 to interfere with each other in the recording layer 101 of the optical disk 100 to thereby record the recording mark RM in the target mark position in the recording layer 101.

To correctly record the recording mark RM as a hologram in the recording layer 101 of the optical disk 100 in accordance with a general hologram formation condition, the laser diode 51 that emits the blue light beam Lb0 needs to set a coherent length of the blue light beam Lb0 to be equal to or larger than a hologram size (i.e., the height RMh of the recording mark RM).

Practically, in the laser diode 51, as in the general laser diode, since the coherent length is substantially equivalent to a value obtained by multiplying the length of a resonator (not shown) provided in the laser diode 51 by a refractive index of the resonator, the coherent length is considered to be about 100 [μm] to 1 [mm].

On the other hand, in the optical pickup 26, the blue light beam Lb1 passes through an optical path in the guide-screen-information optical system 50 (FIG. 9) and is irradiated on the optical disk 100 from the guide surface 100A side thereof. The blue light beam Lb2 passes trough an optical path in the recording-light-irradiation-surface optical system 70 (FIG. 10) and is irradiated on the optical disk 100 from the recording-light irradiation surface 100B side thereof. In other words, in the optical pickup 26, since optical paths of the blue light beams Lb1 and Lb2 are different from each other, there is a difference between lengths of the optical paths (i.e., lengths of the optical paths from the laser diode 51 to the target mark position).

In the optical pickup 26, as described above, the depth of the target mark position (the target depth) in the recording layer 101 of the optical disk 100 is changed by adjusting positions of the movable lenses 61 and 76 in the relay lenses 60 and 75. In this case, as a result, the optical pickup 26 changes the optical path length in the blue light beams Lb1 and Lb2 by changing the depth of the target mark position.

However, to form an interference pattern in the optical pickup 26, according to a general hologram formation condition, a difference between optical path lengths in the blue light beams Lb1 and Lb2 needs to be equal to or smaller than the coherent length (i.e., about 100 [μm] to 1 [mm]).

Thus, the control unit 21 (FIG. 4) controls a position of the movable mirror 57 to thereby adjust an optical path length in the blue light beam Lb1. In this case, the control unit 21 moves the movable mirror 57 according to a position of the movable lens 61 making use of a relation between a position of the movable lens 61 in the relay lens 60 and the depth of the target mark position to thereby change the optical path length in the blue light beam Lb1.

As a result, in the optical pickup 26, it is possible to control the difference between the optical path lengths in the blue light beams Lb1 and Lb2 to be equal to or smaller than the coherent length. It is possible to record the recording mark RM, which is formed by a satisfactory hologram, in the target mark position in the recording layer 101.

As described above, by controlling a position of the movable mirror 57, the control unit 21 of the optical disk apparatus 20 can control the difference between the optical path lengths in the blue light beams Lb1 and Lb2 in the optical pickup 26 to be equal to or smaller than the coherent length. As a result, the control unit 21 can record the satisfactory recording mark RM in the target mark position in the recording layer 101 of the optical disk 100.

(1-4) Recording and Reproduction of Information (1-4-1) Recording of Information on the Optical Disk In recording information on the optical disk 100, as described above, when the control unit 21 (FIG. 4) of the optical disk apparatus 20 receives an information recording command, recording information, and recording address information from an external apparatus (not shown), the control unit 21 supplies a drive command and the recording address information to the drive control unit 22 and supplies the recording information to the signal processing unit 23.

At this point, the drive control unit 22 causes the guide-surface-position control optical system 30 (FIG. 7) of the optical pickup 26 to irradiate the red light beam Lr1 on the optical disk 100 from the guide surfaced 100A side thereof. The drive control unit 22 performs focus control and tracking control (i.e., position control) for the object lens 38 on the basis of a result of detection of the red reflected light beam Lr2, which is reflected light of the red light beam Lr1, to thereby cause the focal point Fr of the red light beam Lr1 to follow a target track corresponding to the recording address information.

The control unit 21 causes the guide-surface-information optical system 50 (FIG. 9) to irradiate the blue light beam Lb1 on the optical disk 100 from the guide surface 100A side thereof. The blue light beam Lb1 is condensed by the object lens 38 subjected to the position control, whereby the focal point Fb1 of the blue light beam Lb1 is located on the rear side of the target track.

The control unit 21 adjusts a position of the movable lens 61 in the relay lens 60 to thereby adjust the depth d1 of the focal point Fb1 (FIG. 3B) to a target depth. As a result, the focal point Fb1 of the blue light beam Lb1 is set in a target mark position.

On the other hand, the control unit 21 controls the shutter 71 of the recording-light-irradiation-surface optical system 70 (FIG. 10) to transmit the blue light beam Lb2 and irradiate the blue light beam Lb2 on the optical disk 100 from the recording-light irradiation surface 100B side thereof.

The control unit 21 adjusts a position of the movable lens 76 in the relay lens 75 according to the position of the movable lens 61 in the relay lens 60 to thereby adjust the depth d2 of the blue light beam Lb2 (FIG. 3B). Consequently, the depth d2 of the focal point Fb2 of the blue light beam Lb2 is set to the depth d1 of the focal point Fb1 in the blue light beam Lb1 at the time when it is assumed that wobble has not occurred in the optical disk 100.

The control unit 21 causes the recording-light-irradiation-surface optical system 70 to detect the blue light beam Lb1 transmitted through the object lenses 38 and 79. The control unit 21 causes the drive control unit 22 to perform focus control, tracking control (i.e., position control) of the object lens 79, and tangential control for the galvano mirror 78 on the basis of a result of the detection.

As a result, the focal point Fb2 of the blue light beam Lb2 is set in a position of the focal point Fb1 of the blue light beam Lb1, i.e., the target mark position.

The control unit 21 adjusts a position of the movable mirror 57 according to the position of the movable lens 61 in the relay lens 60 and controls a difference between the optical path lengths in the blue light beams Lb1 and Lb2 to be equal to or smaller than the coherent length.

In this way, the control unit 21 of the optical disk apparatus 20 can form a satisfactory recording mark RM in the target mark position in the recording layer 101 of the optical disk 100.

The signal processing unit 23 (FIG. 4) generates a recording signal representing, for example, binary data of a value "0" or "1" on the basis of recording information supplied from an external apparatus (not shown). According to the recording signal, for example, the laser diode 51 emits the blue light beam Lb0 when the recording signal takes the value "1" and does not emit the blue light beam Lb0 when the recording signal takes the value "0".

Consequently, the optical disk apparatus 20 forms the recording mark RM in the target mark position in the recording layer 101 of the optical disk 100 when the recording signal takes the value "1" and does not form the recording mark RM in the target mark position when the recording signal takes the value "0". Therefore, the optical disk apparatus 20 can record the value "1" or "0" of the recording signal in the target mark position according to presence or absence of the recording mark RM. As a result, the optical disk apparatus 20 can record the recording information in the recording layer 101 of the optical disk 100.

(1-4-2) Reproduction of Information from the Optical Disk

In reproducing information from the optical disk 100, the control unit 21 (FIG. 4) of the optical disk apparatus 20 causes the guide-surface-position control optical system 30 (FIG. 7) of the optical pickup 26 to irradiate the red light beam Lr1 on the optical disk 100 from the guide surface 100A side thereof. The control unit 21 causes the drive control unit 22 to perform focus control and tracking control (i.e., position control) for the object lens 38 on the basis of a result of detection of the red reflected light beam Lr2, which is reflected light of the red light beam Lr1.

The control unit 21 causes the guide-surface-information optical system 50 (FIG. 9) to irradiate the blue light beam Lb1 on the optical disk 100 from the guide surface 100A side thereof. At this point, the blue light beam Lb1 is condensed by the object lens 38 subjected to the position control, whereby the focal point Fb1 of the blue light beam Lb1 is located on the rear side of the target track.

The control unit 21 controls emission power of the laser diode 51 during reproduction to thereby prevent mis-erasing of the recording mark RM by the blue light beam Lb1.

The control unit 21 adjusts a position of the movable lens 61 in the relay lens 60 to thereby adjust the depth d1 of the focal point Fb1 (FIG. 3B) to the target depth. As a result, the focal point Fb1 of the blue light beam Lb1 is set in the target mark position.

On the other hand, the control unit 21 controls the shutter 71 of the recording-light-irradiation-surface optical system 70 (FIG. 10) and shuts out the blue light beam Lb2 to thereby prevent the blue light beam Lb2 from being irradiated on the optical disk 100.

In other words, the optical pickup 26 irradiates only the blue light beam Lb1 as so-called reference light on the recording mark RM recorded in the target mark position in the recording layer 101 of the optical disk 100. In response to the irradiation of the blue light beam Lb1, the recording mark RM acts as a hologram and generates the blue reproduced light beam Lb3 as so-called reproduced light on the guide surface 101A side. At this point, the guide-surface-information optical system 50 detects the blue reproduced light beam Lb3 and generates a detection signal according to a result of the detection.

In this way, the control unit 21 of the optical disk apparatus 20 can detect the recording of the recording mark RM by generating the blue reproduced light beam Lb3 from the recording mark RM recorded in the target mark position in the recording layer 101 of the optical disk 100 and receiving the blue reproduced light beam Lb3.

When the recording mark RM is not recorded in the target mark position, since the blue reproduced light beam Lb3 is not generated from the target mark position, the optical disk apparatus 20 generates, with the guide-surface-information optical system 50, a detection signal indicating that the blue reproduced light beam Lb3 is not received.

The signal processing unit 22 recognizes, on the basis of the detection signal, detection or nondetection of the blue reproduced light beam Lb3 as the value "1" or "0" and generates reproduction information on the basis of a result of the recognition.

Consequently, the optical disk apparatus 20 receives the blue reproduced light beam Lb3 when the recording mark RM is formed in the target mark position in the recording layer 101 of the optical disk 100 and does not receive the blue reproduced light beam Lb3 when the recording mark RM is not formed in the target mark position. In this way, the optical disk apparatus 20 can recognize which of the values "1" and "0" is recorded in the target mark position. As a result, the optical disk apparatus 20 can reproduce information recorded in the recording layer 101 of the optical disk 100.

(1-5) Correction of Spherical Aberration

When the blue light beams Lb1 and Lb2 are irradiated on the optical disk 100, spherical aberrations occur while the blue light beams Lb1 and Lb2 pass portions from the surfaces of the substrates 102 and 103 to the focal points Fb1 and Fb2 (the thickness of the portions is hereinafter referred to as cover thickness).

When the optical disk apparatus 20 performs multilayer recording by changing the target depth (i.e., the distance from the reflective and transmissive film 104 to the recording mark position) in the recording layer 101 of the optical disk 100, the cover thickness is changed according to the target depth. Thus, the optical disk apparatus 20 also changes the spherical aberrations according to the cover thickness.

However, in order to form a satisfactory interference pattern in the recording mark position and accurately record the recording mark RM, it is desirable that the optical disk apparatus 20 appropriately corrects such spherical aberrations.

(1-5-1) Relation Between the Cover Thickness and the Spherical Aberrations

Figure 12:
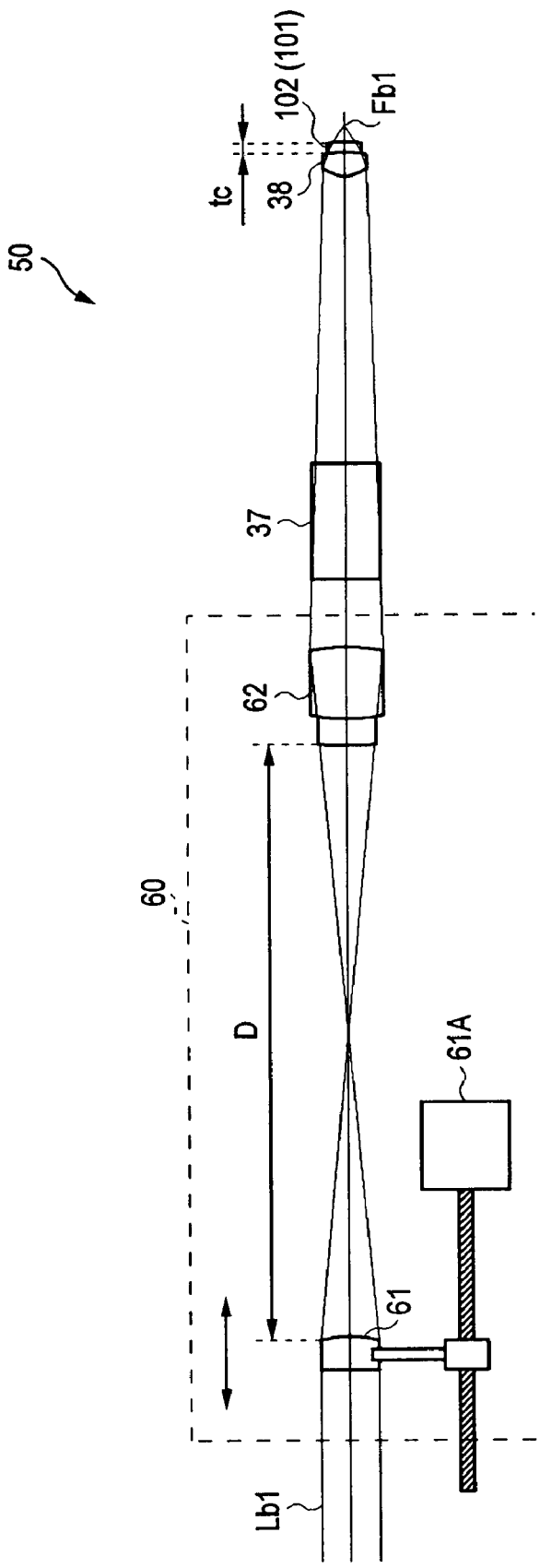
FIG. 12 is a schematic diagram showing an equivalent optical path of the blue light beam.

To examine such spherical aberration, as shown in FIG. 12, attention is paid to a part of an optical path of the blue light beam Lb1 in the guide-surface-information optical system 50. In FIG. 12, for convenience of explanation, respective optical components are arranged to form the optical path in a linear shape unlike those shown in, for example, FIG. 6.

In FIG. 12, it is assumed that a portion corresponding to a cover thickness tc in the optical disk 100 (i.e., a part of the substrate 102 and the recording layer 101) is in contact with the object lens 38. This is because, calculation of spherical aberration takes into account the fact that spherical aberration is equivalent to that in the case in which the portion corresponding to the cover thickness tc is provided in the position of the focal point Fb1.

The guide-surface-information optical system 50 changes the blue light beam Lb1 to converging light at a stage when the blue light beam Lb1 is emitted from the fixed lens 62 of the relay lens 60 and makes the blue light beam Lb1 incident on the object lens 38 via the dichroic prism 37.

As described above, when an interval between the movable lens 61 and the fixed lens 62 in the relay lens 60 (hereinafter referred to as lens interval D) is changed on the basis of the control by the control unit 21 (FIG. 4), the guide-surface-information optical system 50 changes a convergence state of the blue light beam Lb1 emitted from the fixed lens 62. As a result, the guide-surface-information optical system 50 moves the focal point Fb1.

When the guide-surface-information optical system 50 causes the blue light beam Lb1 to pass the portion of the cover thickness tc in the optical disk 100, spherical aberration is caused in the blue light beam Lb1 because of an optical principle.

A value of this spherical aberration (hereinafter referred to as spherical aberration value WFA) can be calculated according to the following Equation (8) using N representing a refractive index, the numerical aperture NA of the object lens 38, the wavelength λ of the blue light beam Lb1, and the cover thickness tc as a premise in designing the object lens 38 (hereinafter referred to as design value tc0).

$$WFA = \frac{1}{\sqrt{5}} \frac{1}{6} \frac{1}{8} \frac{N^2 - 1}{N^3} NA^4 \frac{(tc - tc0)}{\lambda} \qquad (8)$$

(1-5-2) Spherical Aberration in a Virtual Optical System

A virtual optical system optimized and designed when the respective optical components (the relay lens 60 and the object lens 38) shown in FIG. 12 have the cover thickness tc of 0.75 [mm] is assumed. In this case, the moving lens 61 of the relay lens 60 is fixed.

The cover thickness tc is set to 0.75 [mm] assuming that the focal point Fb1 is set at the half of the thickness 1.5 [mm] of the optical disk 100, i.e., in the center in the thickness direction of the optical disk 100.

In this virtual optical system, with the design value tc0 set to 0.75 [mm], a virtual spherical aberration value WFAc was calculated in accordance with Equation (8) by changing the cover thickness tc. Then, a result shown in FIG. 14 (indicated by black circles in the figure) was obtained as an absolute value of the virtual spherical aberration value WFAc.

Figure 14:
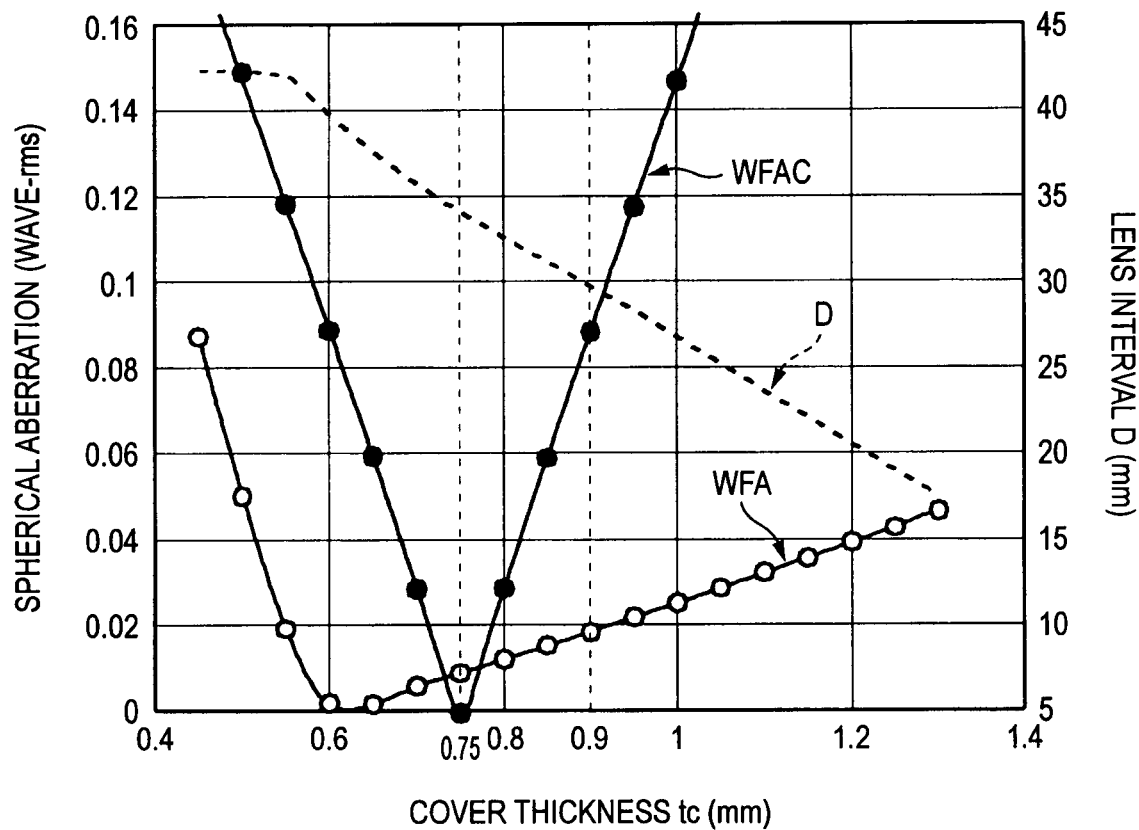
FIG. 14 is a schematic diagram showing a relation between a cover thickness and spherical aberration.

In FIG. 14, a characteristic curve of the virtual spherical aberration value WFAc takes a minimum value when the cover tc is 0.75 [mm], which is the same as the design value tc0, and a spherical aberration value is substantially "0".

The characteristic curve of the virtual spherical aberration value WFAc forms a bent line with a point of the cover thickness tc=0.75 [mm] as a return point. The line is substantially straight in a portion where the cover thickness tc is smaller than 0.75 [mm] and a portion where the cover thickness tc is equal to or larger than 0.75 [mm]. Absolute values of tilts of both the portions are substantially equal.

In other words, in this virtual optical system, it can be said that a difference value of the cover thickness tc from the design value tc0=0.75 [mm] and the virtual spherical aberration value WFAc are in a substantially proportional relation.

(1-5-3) Correction of Spherical Aberration

In the guide-surface-information optical system 50, in order to perform multilayer recording on the optical disk 100, it is necessary to change a target depth. When the target depth is changed, since the cover thickness tc is changed, spherical aberration inevitably occurs.

Thus, in the guide-surface-information optical system 50, if aberration having a characteristic opposite to that of spherical aberration caused by the portion of the cover thickness tc is given to the blue light beam Lb1 at a stage of irradiation on the optical disk 100 in advance, it is possible to correct the spherical aberration.

Specifically, the guide-surface-information optical system 50 can adjust an amount of the aberration having the opposite characteristic by adding the aberration having the opposite characteristic to the blue light beam Lb1 with the relay lens 60 and adjusting the lens interval D.

Concerning the guide-surface-information optical system 50 (FIG. 12), a spherical aberration value WFA was calculated by changing the cover thickness tc in accordance with Equation (8) and an optimum value of the lens interval D for minimizing the spherical aberration value WFA with respect to each cover thickness tc was calculated. Then, a result (indicated by white circles in the figure) shown in FIG. 14 was obtained concerning a relation between the cover thickness tc and the minimum spherical aberration value WFA. A relation between the cover thickness tc and the optimum value of the lens interval D has a characteristic indicated by a broken line in the figure.

In this case, the numerical aperture NA of the object lens 38 is 0.5, the wavelength λ of the blue light beam Lb1 is 405 [nm], and the design value tc0 is 0.6 [mm].

Referring to the characteristic curve (FIG. 14) of the spherical aberration value WFA obtained in this way, it is seen that the spherical aberration value WFA can be set smaller than the virtual spherical aberration value WFAc on the whole by optimally adjusting the lens interval D in the relay lens 60.

In particular, the spherical aberration value WFA monotonously increases substantially linearly in a range corresponding to the recording layer 101, i.e., a range in which the cover thickness tc is 0.6 to 0.9 [mm] (hereinafter referred to as recording range RA). In the recording range RA, the lens interval D takes a relatively small value.

In the relay lens 60, since the cover thickness tc and the lens interval D are in a proportional relation, the spherical aberration value WFA can be minimized by adjusting the lens interval D in proportion to the cover thickness tc.

In the relay lens 60, as described above, an amount of movement of the movable lens 61 (i.e., an amount of adjustment of the lens interval D) and an amount of movement of the focal point Fb1 of the blue light beam Lb1 is also in a proportional relation.

Thus, according to optical design, the actual relay lens 60 is designed such that, when the focal point Fb1 is moved by a distance proportional to the amount of movement of the movable lens 61, the spherical aberration amount WFA is equal to or smaller than an allowable amount (0.02 λrms) in the focal point Fb1 after the movement.

In other words, in the relay lens 60, by moving the movable lens 61, the focal length Fb1 is moved by a distance corresponding to the amount of movement of the movable lens 61 and, at the same time, the spherical aberration amount WFA is minimized.

In a relay lens 75 (FIG. 6) having an optical characteristic same as that of the relay lens 60, as in the relay lens 60, by moving the movable lens 76, the focal point Fb2 is moved by a distance corresponding to an amount of movement of the movable lens 76 and, at the same time, the spherical aberration amount WFA is minimized.

(1-5-4) Movement of the Movable Lenses in the Two Relay Lenses

Figure 13:
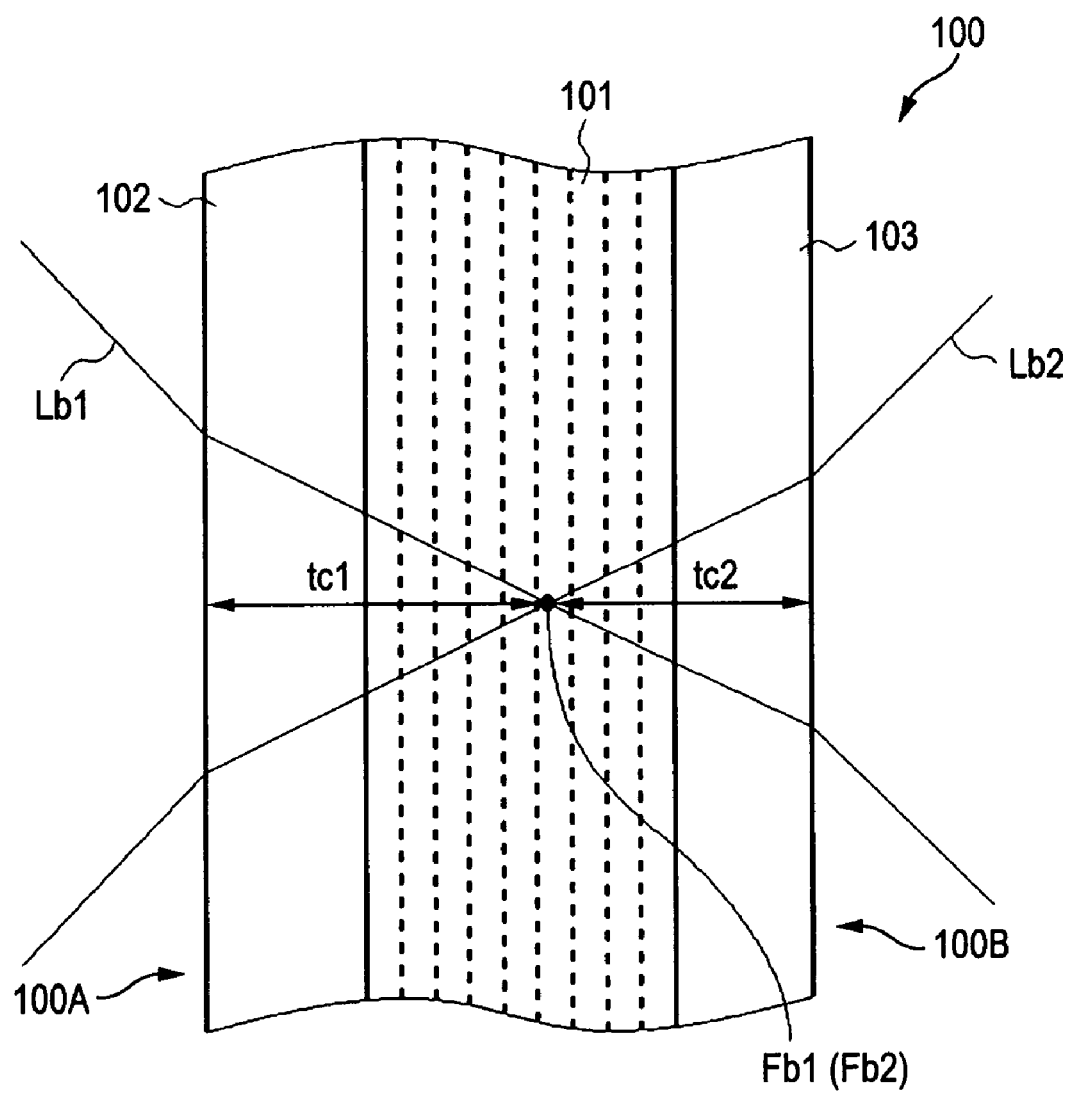
FIG. 13 is a schematic diagram for explaining cover thicknesses of both sides in an optical disk.

In recording the recording mark RM in the target mark position in the recording layer 101 of the optical disk 100, as shown in FIG. 13, the optical disk apparatus 20 irradiates the blue light beams Lb1 and Lb2 on the optical disk 100 from both the guide surface 100A side and the recording-light irradiation surface 100B side to set the focal points Fb1 and Fb2 at the depth of the target mark position (the target depth).

At this point, as shown in FIG. 13, spherical aberrations due to cover thicknesses tc1 and tc2 occur in the blue light beams Lb1 and Lb2, respectively.

The thickness t0 of the entire optical disk 100 is fixed (about 1.5 [mm]). Thus, if positions of the focal points Fb1 and Fb2 coincide with each other, regardless of the target depth, a sum of the cover thickness tc1 and the cover thickness tc2 is typically a fixed value (i.e., the thickness t0 of the entire optical disk 100).

Therefore, in changing the target depth, the optical disk apparatus 20 only has to move the focal points Fb1 and Fb2 of the blue light beams Lb1 and Lb2 such that an increase (or a decrease) in the cover thickness tc1 and a decrease (or an increase) in the cover thickness tc2 are equal.

In the relay lens 60 of the optical disk apparatus 20, as described above, an amount of movement of the movable lens 61 and an amount of movement of the focal point Fb1 of the blue light beam Lb1 are in a proportional relation. Similarly, in the relay lens 75, an amount of movement of the movable lens 76 and an amount of movement of the focal point Fb2 of the blue light beam Lb2 are in a proportional relation.

Figure 15:
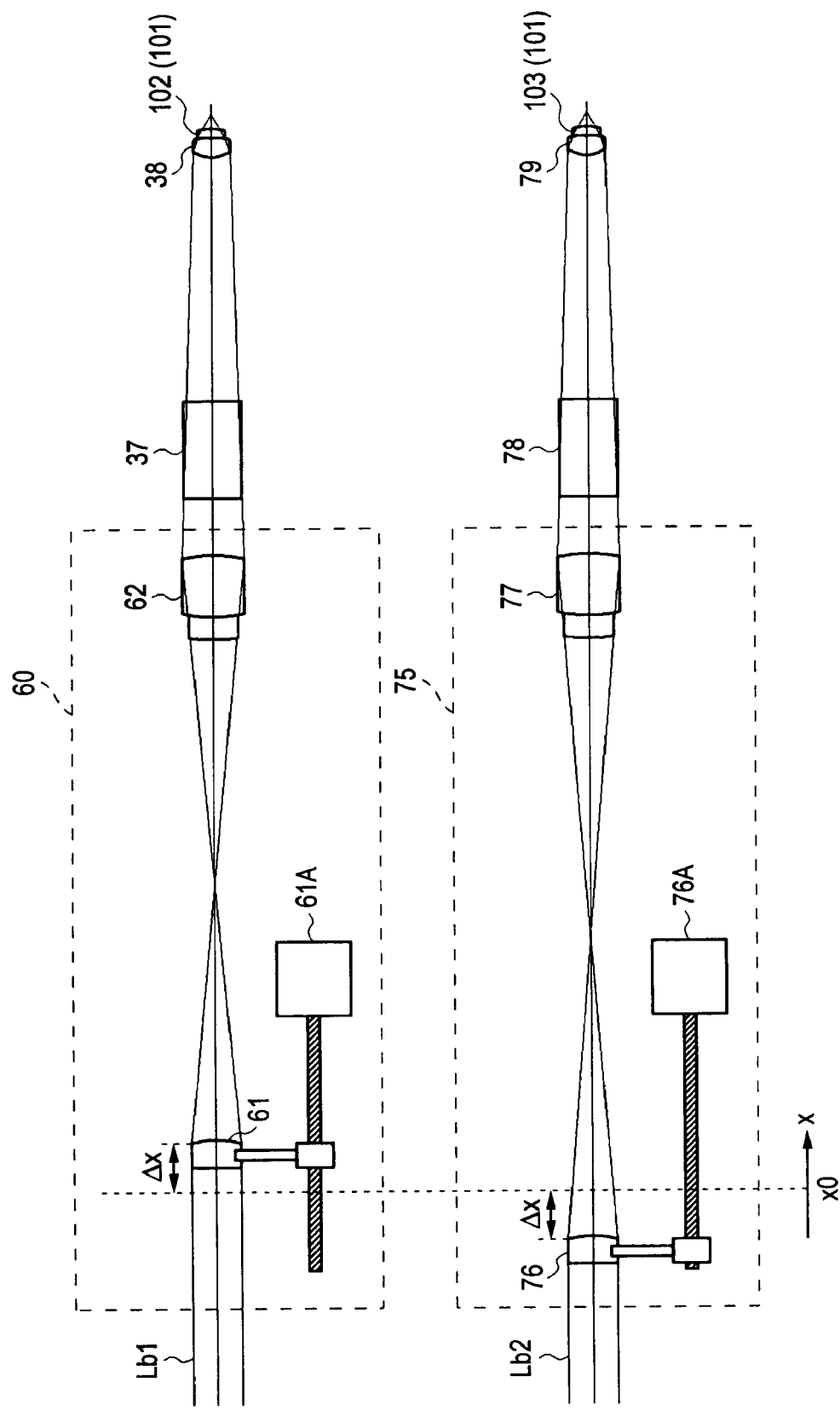
FIG. 15 is a schematic diagram showing a state of movement of a complementary lens.

Thus, in changing the target depth, as shown in FIG. 15, the control unit 21 (FIG. 4) of the optical disk apparatus 20 controls the actuators 61A and 76A of the relay lenses 60 and 75 via the drive control unit 22 to thereby move the movable lenses 61 and 76 from a reference position x0 in a +x direction (the right direction in the figure) and a −x direction (the left direction in the figure) by a distance Δx, respectively.

The position x0 represents a position for setting the focal points Fb1 and Fb2 of the blue light beams Lb1 and Lb2 in the center in the thickness direction of the optical disk.

In this case, complementary spherical aberration values, i.e., spherical aberration values having the same absolute value and opposite signs as shown in FIG. 14, are added to the blue light beams Lb1 and Lb2.

Consequently, the optical disk apparatus 20 can set both the focal points Fb1 and Fb2 of the blue light beams Lb1 and Lb2 at the target depth in the recording layer 101. At the same time, the optical disk apparatus 20 can correct the spherical aberrations that occur in the blue light beams Lb1 and Lb2 to be as small as possible.

As described above, in changing the target depth, the control unit 21 of the optical disk apparatus 20 moves the movable lenses 61 and 76 of the relay lenses 60 and 75 in opposite directions by the same distance in proportion to an amount of change of the target depth to thereby set both the focal points Fb1 and Fb2 of the blue light beams Lb1 and Lb2 at the target depth in the recording layer 101. The control unit 21 adds complementary spherical aberrations to the blue light beams Lb1 and Lb2 and corrects spherical aberrations at the focal points Fb1 and Fb2 to be equal to or smaller than an allowable amount (0.02 λrms).

(1-6) Operations and Effects

In recording information on the optical disk 100, the control unit 21 of the optical disk apparatus 20 causes the guide-surface-position control optical system 30 (FIG. 7) to irradiate the red light beam Lr1 on the optical disk 100 from the guide surface 100A side thereof. The control unit 21 performs focus control and tracking control (i.e., position control) for the object lens 38 on the basis of a result of detection of the red reflected light beam Lr2, which is reflected light of the red light beam Lr1, to thereby cause the focal point Fr of the red light beam Lr1 to follow the target track corresponding to the recording address information.

Then, the control unit 21 causes the guide-surface-information optical system 50 (FIG. 9) to irradiate the blue light beam Lb1 on the optical disk 100 from the guide surface 100A side thereof, causes the recording-light-irradiation-surface optical system 70 to detect the blue light beam Lb1 (FIG. 9) transmitted through the object lenses 38 and 79, and causes the drive control unit 22 to perform position control (i.e., focus control and tracking control) for the object lens 79 and tangential control for the galvano mirror 78 on the basis of a result of the detection.

The control unit 21 controls the shutter 71 of the recording-light-irradiation-surface optical system 70 (FIG. 10) to transmit the blue light beam Lb2 and irradiate the blue light beam Lb2 on the optical disk 100 from the recording-light irradiation surface 100B side thereof.

The control unit 21 moves the movable lenses 61 and 76 of the relay lenses 60 and 75 in opposite directions by the same distance such that the movable lenses 61 and 76 are in positions corresponding to the target depth in the recording layer 101 of the optical disk 100, respectively.

Consequently, the control unit 21 can set the focal points Fb1 and Fb2 of the blue light beams Lb1 and Lb2 at the target depth (i.e., the target mark position) in the recording layer 101 and can record the recording mark RM in the target mark position.

In this case, the control unit 21 makes use of the characteristic that it is possible to minimize the spherical aberration value WFA by adjusting the lens interval D in proportion to the cover thickness tc as shown in FIG. 14. Thus, the control unit 21 can add complementary spherical aberrations to the blue light beams Lb1 and Lb2 and reduce the spherical aberrations at the focal points Fb1 and Fb2 as small as possible by moving the movable lenses 61 and 76 of the relay lenses 60 and 75 by an amount of movement corresponding to the target depth.

In particular, the control unit 21 can control the spherical aberration value WFA (FIG. 14) to be equal to or smaller than about 0.02 in the recording range RA corresponding to the recording layer 101. Thus, even if aberration and the like due to the other optical components in the optical pickup 26 are taken into account, it is highly likely that overall aberration can be controlled to be a value smaller than a threshold 0.07, which is a general reference value.

As a result, the optical disk apparatus 20 can record the recording mark RM formed by a high-quality interference pattern in the target mark position in the recording layer 101 of the optical disk 100.

The control unit 21 makes use of the fact that the relay lenses 60 and 75 are designed such that, when the focal points Fb1 and Fb2 are moved by a distance proportional to an amount of movement of the movable lenses 61 and 76, at the same time, the spherical aberration amount WFA can be minimized. Thus, the control unit 21 can automatically control the spherical aberrations of the blue light beams Lb1 and Lb2 to be equal to or smaller than the allowable amount (0.02 λrms) simply by moving the movable lenses 61 and 76 to set the focal points Fb1 and Fb2 at the target depth.

Therefore, the optical disk 20 does not need to use other optical components for spherical aberration correction such as a liquid crystal element. The control unit 21 does not need to perform other control for correcting spherical aberration when the target depth is changed.

The control unit 21 makes use of the fact that, if positions of the focal points Fb1 and Fb2 coincide with each other in the recording layer 101 of the optical disk 100, a sum of the cover thickness tc1 and the cover thickness tc2 typically coincides with the thickness t0 of the entire optical disk 100. Thus, the control unit 21 can correct both spherical aberrations of the blue light beams Lb1 and Lb2 to be equal to or smaller than the allowable amount (0.02 λrms) by moving the movable lenses 61 and 76 of the relay lenses 60 and 75 in opposite directions by a distance corresponding to the target depth.

In the optical disk apparatus 20, the guide-surface-position control optical system 30 and the guide-surface-information optical system 50 have the optical components other than the polarization beam splitter 37 and the object lens 38 independently from each other. Thus, when the relay lenses 60 and 75 are controlled according to the target depth by the control unit 21 to correct spherical aberrations in the blue light beams Lb1 and Lb2, it is unlikely that the red light beam Lr1 and the red light reflected light beam Lr2 are adversely affected. Accuracy of position control for the object lens 38 is not deteriorated.

As described above, spherical aberration can be minimized by adjusting the lens interval D in proportion to the cover thickness tc, the focal points Fb1 and Fb2 can be moved in proportion to an amount of movement of the movable lenses 61 and 76 and, at the same time, spherical aberration can be minimized by the design of the relay lenses 60 and 75, and a sum of the cover thickness tc1 and the cover thickness tc2 is typically fixed if positions of the focal points Fb1 and Fb2 coincide with each other. The control unit 21 of the optical disk apparatus 20 makes use of these facts to move the movable lenses 61 and 76 of the relay lenses 60 and 75 in opposite directions by the same distance according to the target depth. Consequently, the control unit 21 can add complementary spherical aberrations to the blue light beams Lb1 and Lb2 and can correct both spherical aberrations at the focal points Fb1 and Fb2 to be equal to or smaller than the allowable amount (0.02 λrms).

(2) Second Embodiment (2-1) Structure of an Optical Disk

Figure 16:
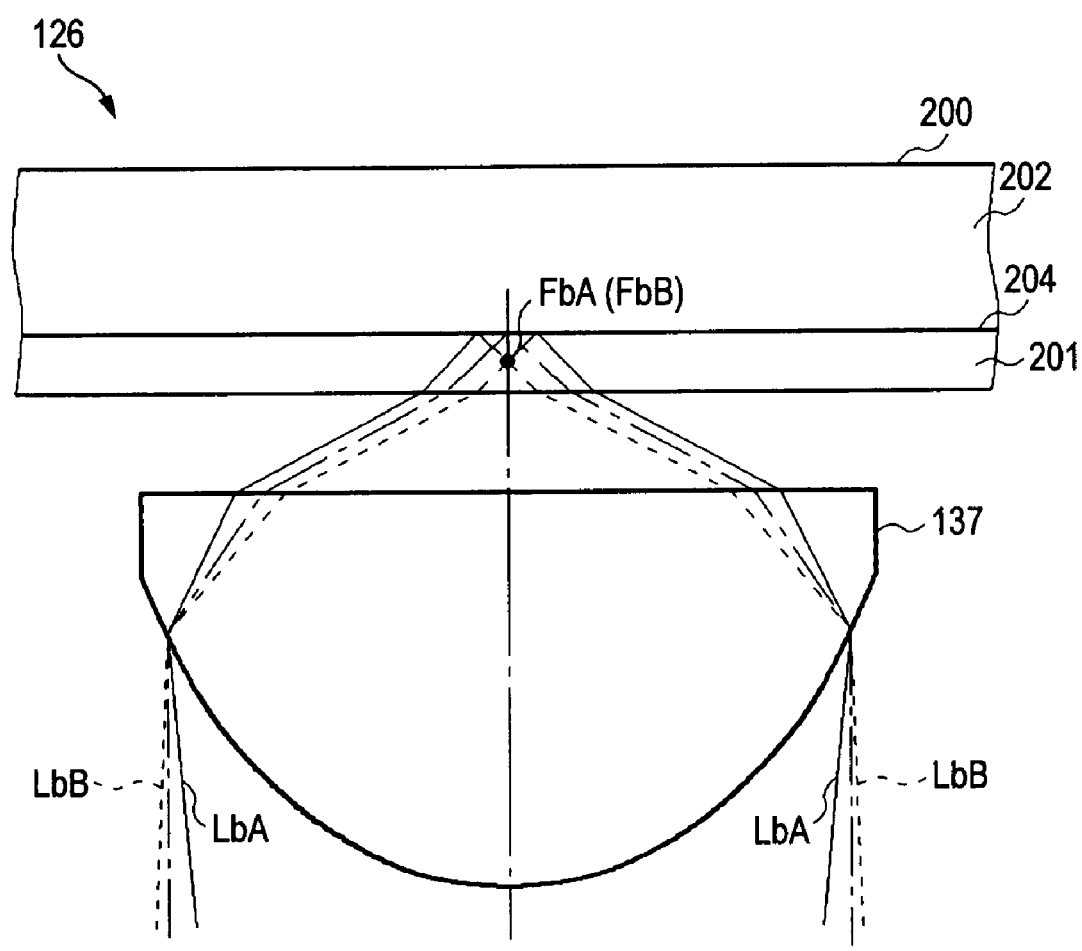
FIG. 16 is a schematic diagram showing the structure of an optical pickup formed by a one-sided optical system.

As shown in FIG. 16 corresponding to FIG. 3B, unlike the optical disk 100 according to the first embodiment, an optical disk 200 according to a second embodiment of the present invention irradiates a light beam on the optical disk 200 only from one side thereof to thereby perform tracking control and focus control and recording and reproduction of information.

The optical disk 200 has the structure obtained by sticking a substrate 202 as a base and a recording layer 201 that can record a hologram therein. A reflective film 204 that reflects a light beam is held between the substrate 202 and the recording layer 201. In the following explanation, a surface on the recording layer 201 side is referred to as recording surface 200A.

The optical disk 200 records the recording mark RM making use of the interference between a light beam irradiated from the recording surface 200A side and reflected on the reflective film 204 and a light beam irradiated from the recording surface 200A side.

In the reflective film 204, as in the reflective and transmissive film 104 of the optical disk 100, a track in which a guide groove is arranged in a spiral shape or a concentric circular shape is formed. It is assumed that the track is used as an index of a position in performing tracking control.

In the optical disk 200, the substrate 202 is not always necessary. In this case, reflection on the rear surface of the optical disk 200 may be used as the reflective film 204. It is also possible to apply nonreflection coating to the front surface of the disk to prevent unnecessary reflection.

(2-2) Structure of an Optical Disk Apparatus

An optical disk apparatus 120 according to the second embodiment is controlled by a control unit 121 (not shown) corresponding to the control unit 21 according to the first embodiment. However, since the optical disk apparatus 120 has the structure same as that of the optical disk 20 (FIG. 4) according to the first embodiment, explanation of the optical disk apparatus 120 is omitted.

Figure 17:
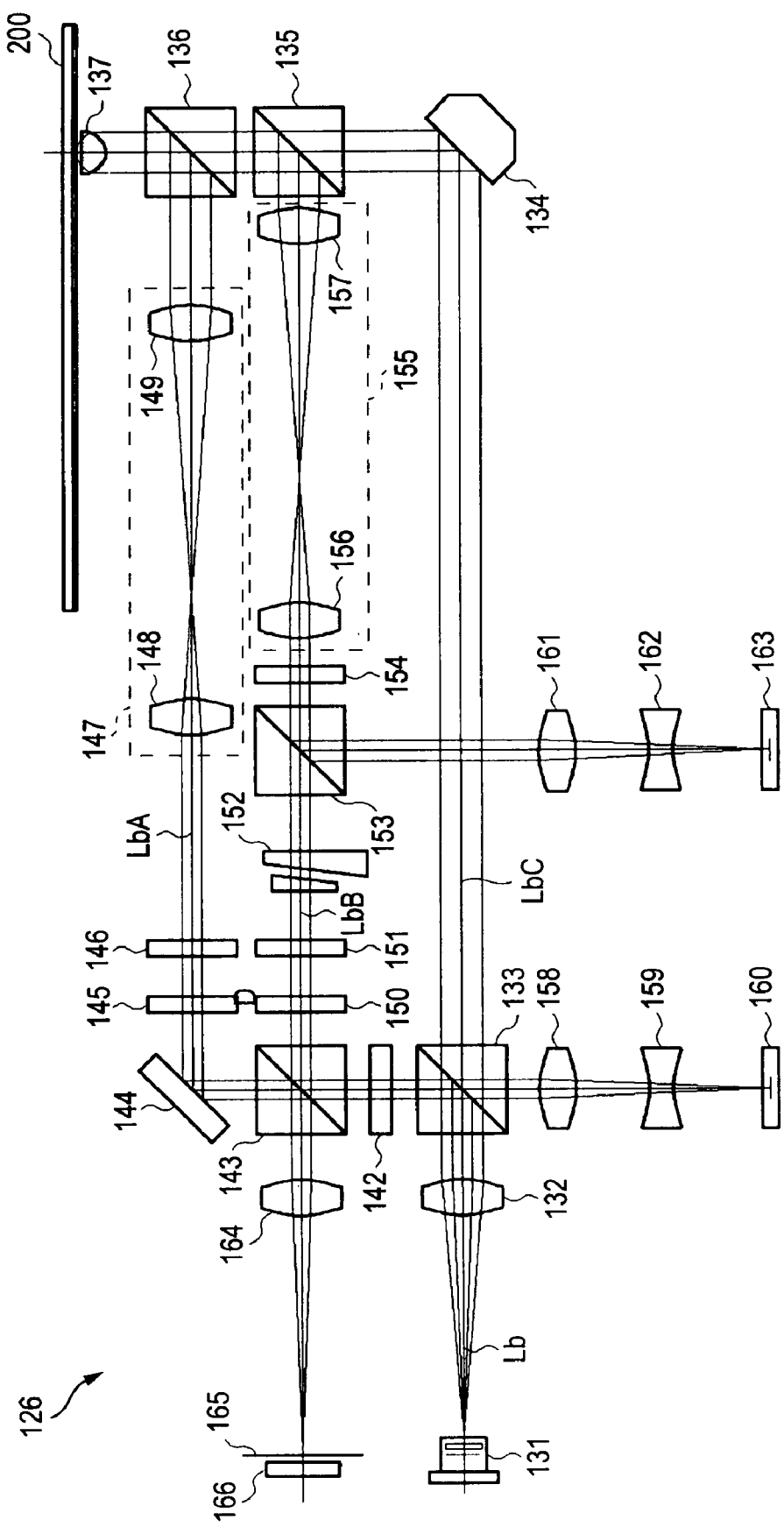
FIG. 17 is a schematic diagram showing a state of irradiation of a light beam on an optical disk.

In FIG. 17 corresponding to FIG. 6, an optical pickup 126 according to the second embodiment realizes a function partially similar to that in the first embodiment in that the optical pickup 126 forms a standing wave according to interference of light beams in a recording layer of the optical disk 200 and records recording marks formed by relatively small holograms over plural layers.

However, the optical pickup 126 is substantially different from the optical pickup 26 (FIG. 6) according to the first embodiment in that a light beam is irradiated on the optical disk 200 only from one surface side thereof.

During recording, the optical pickup 126 divides a blue light beam Lb formed by linear polarized light emitted from an identical laser diode into three light beams, i.e., blue light beam LbC for tracking control and focus control and blue light beams LbA and LbB for hologram recording. On the other hand, during reproduction, the optical pickup 126 divides the blue light beam Lb into two light beams, i.e., a light beam LbC for tracking and focus servo and a blue light beam LbA for hologram reading.

First, the blue light beam LbC used for tracking control and focus control during recording and reproduction is explained. A laser diode 131 emits the blue light beam Lb having a wavelength of 405 [nm] and makes the blue light beam Lb incident on a collimator lens 132. The collimator lens 132 converts the blue light beam Lb into parallel light and then makes the blue light beam Lb incident on a beam splitter 133.

The beam splitter 133 reflects most of the blue light beam Lb and, on the other hand, transmits a part of the remaining blue light beam Lb as the blue light beam LbC and makes the part of the remaining blue light beam LbC incident on an object lens 137 through a mirror 134 and beam splitters 135 and 136.

The object lens 137 condenses the blue light beam LbC and irradiates the blue light beam LbC on the reflective film 204 of the optical disk 200 (FIG. 17). The object lens 137 receives the blue light beam LbC reflected on the reflective film 204 and makes the blue light beam LbC incident on the beam splitter 133 sequentially through the beam splitters 136 and 135 and the mirror 134 reversely tracing a path of the blue light beam Lb made incident on the object lens 137.

The beam splitter 133 reflects the blue light beam LbC to deflect an angle thereof by 90° and irradiates the blue light beam LbC on a photodetector 160 via a condenser lens 158 and a cylindrical lens 159. The photodetector 160 having four divided detection areas in the same manner as the photodetector 43 (FIG. 8) generates a detection signal corresponding to an amount of light reception of the blue light beam LbC and supplies the detection signal to the signal processing unit 23.

The signal processing unit 23 generates a focus error signal SFEr and a tracking error signal STEr in accordance with Equations (3) and (4) on the basis of the detection signal and transmits the focus error signal SFEr and the tracking error signal STEr to the drive control unit 22. The drive control unit 22 generates a focus drive control signal SFDr and a tracking drive control signal STDr on the basis of the focus error signal SFEr and the tracking error signal STEr and supplies the focus drive control signal SFDr and the tracking drive control signal STDr to a not-shown biaxial actuator 137A to thereby drive the object lens 137 in a focus direction and a tracking direction.

The blue light beam LbA used during recording of a standing wave is explained. The beam splitter 133 makes most of the reflected blue light beam Lb incident on a half-wave plate 142. The half-wave plate 142 directly transmits about half of the blue light beam Lb made incident thereon and, on the other hand, changes a polarization direction of the remaining about half of the blue light beam Lb by 90° and makes the remaining about half of the blue light beam Lb incident on a polarization beam splitter 143.

The polarization beam splitter 143 transmits the about half of the blue light beam LbA and makes the about half of the blue light beam LbA incident on a movable galvano mirror 144 that deflects the direction of the blue light beam LbA. The galvano mirror 144 changes an angle of the blue light beam LbA by reflecting the same and makes the blue light beam LbA incident on a liquid crystal panel 145.

The liquid crystal panel 145 corrects spherical aberration of the blue light beam LbA and comatic aberration due to a tilt of the disk and makes the blue light beam LbA incident on a quarter-wave plate 146. The quarter-wave plate 146 converts linear polarized light into, for example, right circular polarized light and makes the blue light beam LbA incident on the beam splitter 136 sequentially through a movable lens 148 and a fixed lens 149 of a relay lens 147.

The relay lens 147 drives the movable lens 148 to control an interval between the movable lens 148 and the fixed lens 149 to thereby move the focal point FbA of the blue light beam LbA in the focus direction and adjust a distance of the focal point FbA from the reflective film 204.

The beam splitter 136 reflects the blue light beam LbA, deflects a direction thereof by 90°, and makes the blue light beam LbA incident on the object lens 137. The object lens 137 condenses the blue light beam LbA and irradiates the blue light beam LbA on a target mark position in the recording layer 201 of the optical disk 200.

A blue light beam LbB used during recording of a standing wave in the same manner as the blue light beam LbA is explained. Since optical components on an optical path of the blue light beam LbB play roles same as those of the optical components on the optical path of the blue light beams LbA, redundant explanation is omitted.

The polarization beam splitter 143 reflects the remaining half of the blue light beam Lb to change the same to the blue light beam LbB and makes the blue light beam LbB incident on an optical compensator 152 through a liquid crystal panel 150 and a half-wave plate 151. The optical compensator 152 sets an optical path length in the blue light beam LbB to be the same as that of the blue light beam LbA using a difference in a refractive index and then makes the blue light beam LbB incident on a polarization beam splitter 153.

The polarization beam splitter 153 makes the blue light beam LbB incident on the beam splitter 135 sequentially through a quarter-wave plate 154 and a movable lens 156 and a fixed lens 157 of a relay lens 155.

The beam splitter 135 reflects the blue light beam LbB to thereby deflect a direction thereof by 90° and makes the blue light beam LbB incident on the object lens 137 through the beam splitter 136. The object lens 137 sets a focal point FbB, which is formed after the blue light beam LbB is reflected and returned by the reflective film 204, in the target mark position in the recording layer 201.

As a result, as shown in FIG. 16, since the blue light beam LbA and the blue light beam LbB form a standing wave in the target mark position, the optical pickup 126 can record an interference pattern of the standing wave in the recording layer 202 of the optical disk 200 as the recording mark RM.

The optical pickup 126 drives the object lens 137 such that the blue light beam LbC is focused on a target track in the reflective film 204. The optical pickup 126 controls positions of the focal point FbA and FbB of the blue light beams LbA and LbB in the focus direction with the relay lenses 147 and 155, respectively.

The optical pickup 126 controls the blue light beams LbA, LbB, and LbC in the tracking direction with the object lens 137. When focus shift occurs because of skew or the like, the optical pickup 126 controls the blue light beam LbA with the galvano mirror 144. In this way, the optical pickup 126 sets the focal points FbA and FbB in the target mark position.

The object lens 137 condenses the blue light beam LbA (indicated by a broken line) reflected on the reflective film 204 and makes the blue light beam LbA incident on the beam splitter 136. At this point, the beam splitter 136 transmits the blue light beam LbA, which has been changed to left circular polarized light by the reflection on the reflective film 201, and makes the blue light beam LbA incident on the beam splitter 135.

The beam splitter 135 reflects the blue light beam LbA and makes the blue light beam LbA incident on the beam splitter 153 through the relay lens 155 and the quarter-wave plate 154. The beam splitter 153 reflects the blue light beam LbA, changes a direction thereof by 90°, and makes the blue light beam LbA incident on a photodetector 163 sequentially through a condenser lens 161 and a cylindrical lens 162.

The photodetector 160 having four divided detection areas in the same manner as the photodetector 43 (FIG. 8) generates a detection signal corresponding to an amount of light reception of the blue light beam LbA and supplies the detection signal to the signal processing unit 23 in the same manner as the photodetector 82.

The signal processing unit 23 generates a focus error signal SFEb, a tracking error signal STEb, and a tangential error signal SNEb in accordance with Equations (5), (6), and (7) and transmits the focus error signal SFEb, the tracking error signal STEb, and the tangential error signal SNEb to the drive control unit 22.

On the other hand, the object lens 137 condenses the blue light beam LbB (indicated by a broken line) reflected on the reflective film 204 and makes the blue light beam LbB incident on the beam splitter 136. At this point, the beam splitter 136 reflects the blue light beam LbB, which has been changed to right circular polarized light by the reflection on the reflective film 204, and makes the blue light beam LbB incident on the relay lens 147.

The relay lens 147 transmits the blue light beam LbB and makes the blue light beam LbB incident on the polarization beam splitter 143 through the quarter-wave plate 146, the liquid crystal panel 145 and the galvano mirror 144. The polarization beam splitter 143 reflects the blue light beam LbB, changes a direction thereof by 90°, and makes the blue light beam LbB incident on a photodetector 166 through a condenser lens 164 and a pinhole plate 165.

The photodetector 166 detects an amount of light reception of the blue light beam LbB in reproduction processing and does not execute signal processing in recording processing.

On the other hand, in reproduction processing, the optical pickup 126 shuts out the blue light beam LbB with a shutter added to the optical compensator 152 and irradiates only the blue light beam LbA on the recording layer 201 of the optical disk 200. At this point, the blue light beam LbA is irradiated on the recording mark RM to generate reproduced light. This reproduced light is guided to the photodetector 166 as the blue light beam LbB tracing, in an opposite direction, an optical path identical with an optical path through which the blue light beam LbB is guided to the object lens 137.

The pinhole plate 165 provided at a pre-stage of the photodetector 166 shuts out defocused return light, which is reflected by the reflective film 201 when the recording mark RM is not recorded, and makes only the blue light beam LbB from the recording mark RM incident on the photodetector 166. The photodetector 166 detects an amount of light reception of the blue light beam LbB and generates a reproduced RF signal with the signal processing unit 23.

(2-3) Correction of Spherical Aberration

The relay lenses 147 and 155 according to the second embodiment have the same structure as the relay lenses 60 and 75 according to the first embodiment. In the optical disk 200, an interval from the surface of the recording layer 201 to the reflective film 204 is fixed. Thus, when a distance from the reflective film 204 (i.e., a target depth) in the focal points FbA and FbB of the blue light beams LbA and LbB is changed, amounts of movement of the focal points FbA and FbB coincide with each other.

Therefore, a relation same as that in the first embodiment is established between positions of the focal point FbA and FbB in the blue light beams LbA and LbB and amounts of movement of the movable lenses 148 and 156 in the relay lenses 147 and 155.

The control unit 121 controls actuators (not shown) of the relay lenses 147 and 155 through the drive control unit 22 in the same manner as those of the relay lenses 60 and 75 according to the first embodiment and moves the movable lenses 148 and 156 in opposite directions by the same distance. In this way, the control unit 121 can set the focal points FbA and FbB of the blue light beams LbA and LbB at the target depth.

According to optical design, the relay lenses 147 and 155 are designed such that, when the focal points FbA and FbB are moved by a distance proportional to the amount of movement of the movable lens 61, spherical aberrations are equal to or smaller than an allowable amount (0.02 λrms) simultaneously in the focal points FbA and FbB after the movement.

Therefore, in the relay lenses 147 and 155, as in the relay lenses 60 and 75 according to the first embodiment, by moving the movable lenses 148 and 156, the focal points FbA and FbB are moved by a distance corresponding to an amount of movement of the movable lenses 148 and 156 and, at the same time, complementary spherical aberrations are added to the blue light beams LbA and LbB. In this way, it is possible to minimize spherical aberrations in the focal points FbA and FbB.

(2-4) Operations and Effects

As described above, in recording information in the optical disk 200, the control unit 121 of the optical disk apparatus 120 detects the blue light beam LbC reflected by the optical disk 200, performs tracking control and focus control for the object lens 137, and irradiates the blue light beams LbA and LbB on the optical disk 200.

The control unit 121 complementarily moves the movable lenses 148 and 156 of the relay lenses 147 and 155 to positions corresponding to the target depth in the recording layer 201 of the optical disk 200.

Consequently, the control unit 121 can set the focal points FbA and FbB of the blue light beams LbA and LbB at the target depth (i.e., the target mark position) in the recording layer 201 and can record the recording mark RM in the target mark position.

In this case, as in the first embodiment, simply by moving the movable lenses 148 and 156 of the relay lenses 147 and 155 by an amount of movement corresponding to the target depth, the control unit 121 can set the movable lenses 148 and 156 in the focal points FbA and FbB of the blue light beams LbA and LbB and automatically correct spherical aberrations of the blue light beams Lb1 and Lb2 to be equal to or smaller than the allowable amount (0.02 λrms).

As described above, as in the first embodiment, the control unit 121 of the optical disk apparatus 120 moves the movable lenses 148 and 156 of the relay lenses 147 and 155 in opposite directions by the same distance according to the target depth to thereby add complementary spherical aberrations to the blue light beams LbA and LbB. In this way, the control unit 121 can minimize spherical aberrations at the focal points FbA and FbB.

(3) Other Embodiments

Figure 18:
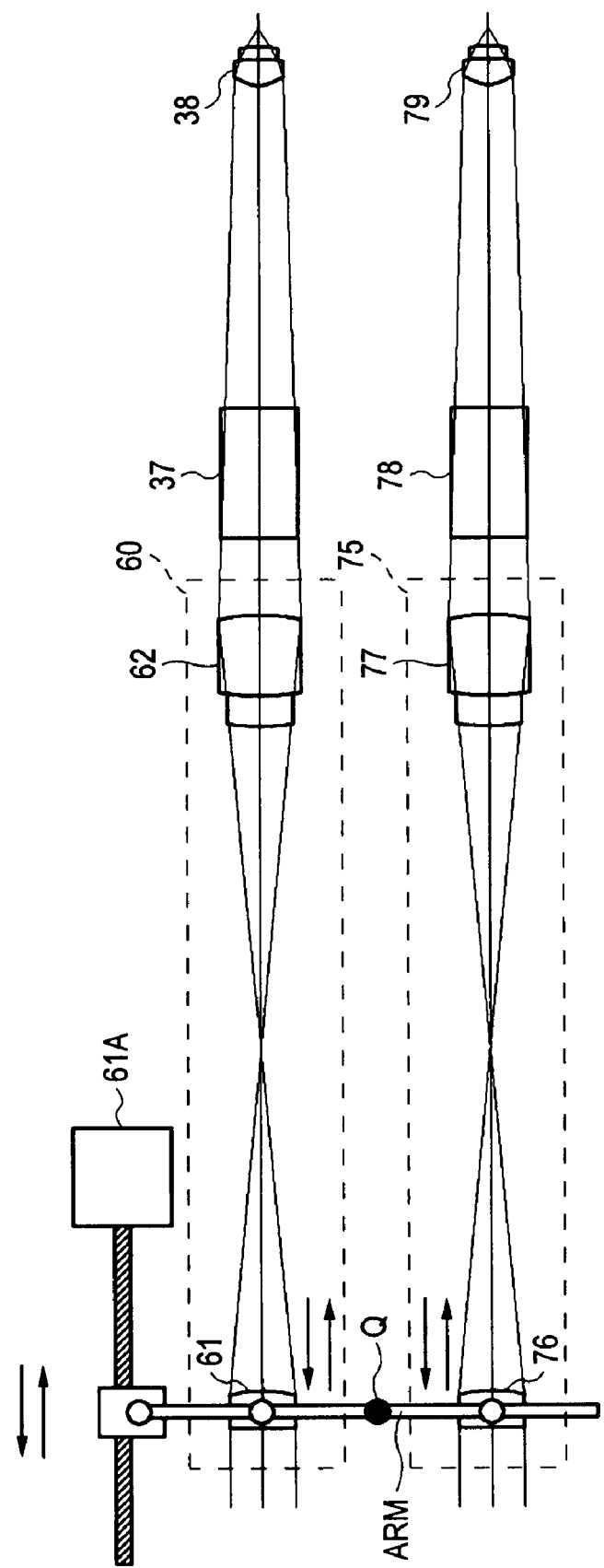
FIG. 18 is a schematic diagram showing a state of movement of a complementary lens according to another embodiment.

In the embodiments described above, the actuators 61A and 76A of the relay lenses 60 and 75 are controlled by the control unit 21 via the drive control unit 22, respectively, whereby the movable lenses 61 and 76 are complementarily moved. However, the present invention is not limited to this. The movable lenses 61 and 76 may be complementarily moved by mechanical means. For example, as shown in FIG. 18, the movable lenses 61 and 76 are mechanically connected by a link arm ARM, which can be rotated around a rotation axis Q and, only when the movable lens 61 is moved in one direction by the actuator 61A, the movable lens 76 is moved in the other direction by the same distance by an action of the link arm ARM.

In the embodiments described above, according to design of the relay lenses 60 and 75, when the focal points Fb1 and Fb2 are moved by a distance proportional to an amount of movement of the movable lenses 61 and 76, at the same time, the spherical aberration amount WFA can be minimized. However, the present invention is not limited to this. For example, the relay lenses 60 and 75 may adjust only positions of the focal points Fb1 and Fb2 according to positions of the movable lenses 61 and 76 without performing correction of spherical aberrations. A liquid crystal element or the like for spherical aberration correction may be separately provided.

In this case, liquid crystal elements or the like only has to be provided on optical paths of the blue light beams Lb1 and Lb2, respectively, to complementarily adjust amounts of correction of spherical aberrations in the respective liquid crystal elements.

In the embodiments described above, the target depth (i.e., the distance from the reflective and transmissive film 104) in the optical disk 100 is adjusted by the relay lenses 60 and 75. However, the present invention is not limited to this. The target depth may be changed by other methods. For example, the target depth is changed by moving a single condenser lens or the target depth is changed by performing focus control for the object lenses 38 and 79.

In the embodiments described above, the reflective and transmissive film 104 is provided between the recording layer 101 and the substrate 102 in the optical disk 100. However, the present invention is not limited to this. For example, the reflective and transmissive film 104 may be provided in other places such as between the recording layer 101 and the substrate 103 and the inside of the substrate 102 or the inside of the recording layer 101.

In the embodiments described above, the light beam for performing position control for the object lens 38 (this is referred to as position control light beam) is the red light beam having a wavelength of about 660 [nm] and the light beam for forming the recording mark RM (this is referred to as recording light beam) is the blue light beam having a wavelength of about 405 [nm]. However, the present invention is not limited to this. The position control light beam and the recording light beam may have arbitrary wavelengths, respectively.

In this case, the reflective and transmissive film 104 only has to have a characteristic of reflecting the position control light beam according to a wavelength thereof and transmitting the recording light beam according to a wavelength thereof. The recording layer 101 only has to be a material reactive to the wavelength of the recording light beam.

In this case, since the wavelength λ is included in Equation (8), the relay lenses 60 and 75 only have to be designed after spherical aberration corresponding to the wavelength of the recording light beam is calculated.

When the wavelength of the recording light beam is changed, as indicated by Equations (1) and (2), since the size of the recording marks RM changes, it is preferable to appropriately change the distance p1 between the recording marks RM, the distance p2 between the tracks, and the distance p3 between the mark recording layers.

In the first embodiment described above, so-called positive type recording for recording the recording mark RM representing the value "0" or "1" of information by forming a very small hologram anew in the recording layer 101 of the optical disk 100 is performed. However, the present invention is not limited to this. So-called negative type recording may be performed. In the negative type recording, holograms extending over substantially the entire surface of the optical disk 100 are formed in multiple layers at each predetermined interval and the value "0" or "1" of information is recorded by focusing the blue light beams Lb1 and Lb2 of predetermined intensity in the target mark position to destroy (erase) the hologram in the target mark position.

In the embodiments described above, the diameter of the optical disk 100 is set to about 120 [mm], the thickness t1 of the recording layer 101 is set to about 0.3 [mm], and the thicknesses t2 and t3 of the substrates 102 and 103 are set to about 0.6 [mm]. However, the present invention is not limited to this. The diameter of the optical disk 100, the thickness t1 of the recording layer 101, and the thicknesses t2 and t3 of the substrates 102 and 103 may be other values, respectively. In this case, taking into account the thicknesses of the recording layer 101 and the substrates 102 and 103, refractive indexes of respective materials, and the like, optical characteristics, arrangements, and the like of the respective optical components only have to be set such that focal points of the blue light beams Lb1 and Lb2 are set in the target mark position.

In the embodiments described above, the optical disk apparatuses 20 and 120 include the relay lenses 60 and 70 and the relay lenses 147 and 155 as aberration adding means, respectively. However, the present invention is not limited to this. An optical disk apparatus may include aberration adding means having other various circuit configurations.

The present invention can be used in an optical disk apparatus that records a large quantity of music contents, video contents, various data, or the like in an optical disk as a recording medium.

It should be understood by those skilled in the art that various modifications, combinations, sub-combinations, and alterations may occur depending on design requirements and other factors insofar as they are within the scope of the appended claims or the equivalents thereof.

What is claimed is:

1. An optical disk apparatus that irradiates first and second lights, which are emitted from an identical light source, on a disk-like volumetric recording medium from both sides thereof with first and second object lenses corresponding to the first and second lights, respectively, such that the lights are focused in an identical focal point position and records a standing wave, the optical disk apparatus comprising:

aberration adding means for adding complementary aberrations to the first and second lights made incident on the volumetric recording medium, respectively, the complementary aberrations including a first aberration correction added to the first light and a second aberration correction added to the second light, the first aberration correction and the second aberration correction having a same absolute value and having opposite signs.

2. An optical disk apparatus according to claim 1, wherein the aberration adding means changes divergence angles in the first and second lights made incident on the first and second object lenses, respectively, to thereby add the aberrations to the first and second lights.

3. An optical disk apparatus according to claim 1, wherein the aberration adding means has a first correction lens in a path in the first light and has a second correction lens in a path in the second light, and the aberration adding means reduces one of a distance from the first correction lens to the first object lens and a distance from the second correction lens to the second object lens by an amount corresponding to aberration that should be added and expands the other by the same amount to thereby add the aberrations to the first and second lights, respectively.

4. An optical disk apparatus according to claim 3, wherein, according to a change of the distance from the first correction lens to the first object lens and the distance from the second correction lens to the second object lens, the aberration adding means changes distances from surfaces of incidence on the volumetric recording medium in the first and second lights to the focal point, respectively.

5. An optical disk apparatus according to claim 4, wherein the aberration adding means is designed to correct, when the distances from the surfaces of incidence on the volumetric recording medium in the first and second lights to the focal point are changed, respectively, according to the change of the distance from the first correction lens to the first object lens and the distance from the second correction lens to the second object lens, the aberrations according to passing distances of the first and second lights in the volumetric recording medium.

6. An optical disk apparatus according to claim 1, further comprising irradiating means for irradiating third light emitted from another light source on the volumetric recording medium through the first object lens on an optical axis identical with that of the first light, wherein the first control means subjects the first object lens to position control on the basis of return light formed when the third light is reflected by a reflection layer provided in the volumetric recording medium.

7. An optical aberration correcting method in irradiating first and second lights, which are emitted from an identical light source, on a predetermined irradiation object from both sides thereof with first and second object lenses corresponding to the first and second lights, respectively, such that the lights are focused in an identical focal point position, the optical aberration correcting method comprising:

adding complementary aberrations to the first and second lights made incident on the irradiation object, the complementary aberrations including a first aberration correction added to the first light and a second aberration correction added to the second light, the first aberration correction and the second aberration correction having a same absolute value and having opposite signs.

8. An optical disk apparatus that irradiates first and second lights, which are emitted from an identical light source, on a disk-like volumetric recording medium from both sides thereof with first and second object lenses corresponding to the first and second lights, respectively, such that the lights are focused in an identical focal point position and records a standing wave, the optical disk apparatus comprising:

aberration adding means for adding complementary aberrations to at least one of the first and second lights made incident on the volumetric recording medium; and irradiating means for irradiating a third light emitted from another light source on the volumetric recording medium through the first object lens on an optical axis identical with that of the first light, wherein the first control means subjects the first object lens to position control on the basis of return light formed when the third light is reflected by a reflection layer provided in the volumetric recording medium.

9. An optical disk recording method of recording a standing wave on a disk-like volumetric recording medium, the optical disk recording method comprising:

irradiating first and second lights, which are emitted from an identical light source, on the volumetric recording medium from both sides thereof with first and second object lenses corresponding to the first and second lights, respectively, such that the lights are focused in an identical focal point position;

adding complementary aberrations to at least one of the first and second lights made incident on the volumetric recording medium;

irradiating a third light emitted from another light source on the volumetric recording medium through the first object lens on an optical axis identical with that of the first light; and controlling the first object lens on the basis of return light formed when the third light is reflected by a reflection layer provided in the volumetric recording medium.

10. An optical disk apparatus that irradiates first and second lights, which are emitted from an identical light source, on a disk-like volumetric recording medium from both sides thereof with first and second object lenses corresponding to the first and second lights, respectively, such that the lights are focused in an identical focal point position and records a standing wave, the optical disk apparatus comprising:

an aberration adding unit configured to add complementary aberrations to the first and second lights made incident on the volumetric recording medium, respectively, the complementary aberrations including a first aberration correction added to the first light and a second aberration correction added to the second light, the first aberration correction and the second aberration correction having a same absolute value and having opposite signs.

11. An optical disk apparatus that irradiates first and second lights, which are emitted from an identical light source, on a disk-like volumetric recording medium from both sides thereof with first and second object lenses corresponding to the first and second lights, respectively, such that the lights are focused in an identical focal point position and records a standing wave, the optical disk apparatus comprising:

an aberration adding unit configured to add complementary aberrations to at least one of the first and second lights made incident on the volumetric recording medium;

an irradiating unit configured to irradiate a third light emitted from another light source on the volumetric recording medium through the first object lens on an optical axis identical with that of the first light; and a controller configured to control a position of first object lens on a basis of return light formed when the third light is reflected by a reflection layer provided in the volumetric recording medium.

* * * * *